(12) United States Patent
Zhou et al.

(10) Patent No.: US 10,143,066 B2
(45) Date of Patent: Nov. 27, 2018

(54) SENSOR WITH WIRELESS DEVICE FOR CONTROLLING A LIGHT SOURCE

(71) Applicant: MW McWong International, Inc., Sacramento, CA (US)

(72) Inventors: Yan Zhou, Sacramento, CA (US); Michael Darren Musgrove, Dixon, CA (US); Andrew Judy, Sacramento, CA (US); Blane Goettle, Sacramento, CA (US)

(73) Assignee: MW McWong International, Inc., Sacramento, CA (US)

( * ) Notice: Subject to any disclaimer, the term of this patent is extended or adjusted under 35 U.S.C. 154(b) by 0 days.

(21) Appl. No.: 15/439,682

(22) Filed: Feb. 22, 2017

(65) Prior Publication Data

US 2017/0245347 A1  Aug. 24, 2017

Related U.S. Application Data

(60) Provisional application No. 62/298,922, filed on Feb. 23, 2016.

(51) Int. Cl.
*H05B 37/00* (2006.01)
*H05B 37/02* (2006.01)

(52) U.S. Cl.
CPC ..... *H05B 37/0227* (2013.01); *H05B 37/0218* (2013.01); *H05B 37/0272* (2013.01); *H05B 37/0281* (2013.01)

(58) Field of Classification Search
CPC .. H05B 37/029; H05B 37/02; H05B 37/0218; H05B 37/0227; H05B 41/325; H05B 41/3922; H05B 41/32; H05B 39/042; Y02B 20/46; Y02B 20/44; F02P 7/0632; F21S 10/02; G03B 15/05
See application file for complete search history.

(56) References Cited

U.S. PATENT DOCUMENTS

| | | | | |
|---|---|---|---|---|
| 2014/0001961 | A1* | 1/2014 | Anderson | H05B 37/0227 315/153 |
| 2015/0002028 | A1* | 1/2015 | Chen | G08B 15/00 315/153 |
| 2015/0195883 | A1* | 7/2015 | Harris | H05B 33/0845 315/155 |
| 2015/0271900 | A1 | 9/2015 | Wright et al. | |
| 2015/0296599 | A1* | 10/2015 | Recker | H05B 37/0272 315/153 |
| 2015/0305125 | A1 | 10/2015 | Chen | |
| 2015/0338077 | A1 | 11/2015 | Johnson | |

(Continued)

FOREIGN PATENT DOCUMENTS

| | | |
|---|---|---|
| EP | 2925098 A1 | 9/2015 |
| KR | 1020130050440 A | 5/2013 |
| KR | 1020140126631 A | 10/2014 |

*Primary Examiner* — Minh D A
(74) *Attorney, Agent, or Firm* — Knobbe Martens Olson & Bear LLP

(57) ABSTRACT

A sensor, such as a motion sensor and/or an occupancy sensor, can include the capability of communicating wirelessly with a user device such that sensor settings can be adjusted via an application running on the user device. The sensor settings may determine when one or more light sources (e.g., a light fixture, a light bulb, a light emitting diode (LED), etc.) turn on and/or the amount of light produced by the one or more light sources.

12 Claims, 23 Drawing Sheets

(56) References Cited

U.S. PATENT DOCUMENTS

2015/0382435 A1* 12/2015 Noesner ............ H05B 37/0272
 315/158
2016/0027262 A1 1/2016 Skotty et al.

* cited by examiner

SENSOR WITH WIRELESS DEVICE FOR CONTROLLING A LIGHT SOURCE

CROSS-REFERENCE TO RELATED APPLICATION

This application claims priority under 35 U.S.C. § 119(e) to U.S. Provisional Patent Application No. 62/298,922, entitled "MOTION SENSOR WITH EMBEDDED WIRELESS TRANSCEIVER FOR CONTROLLING A LIGHT SOURCE" and filed on Feb. 23, 2016, the entire disclosure of which is hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

As energy costs rise due to various global factors, reducing energy usage has gained greater importance. Today, energy efficient light fixtures, such as light emitting diodes (LEDs) that output light at standard levels while using less energy, are available and are being installed to replace conventional incandescent light bulbs, compact fluorescent lighting (CFL) light bulbs, linear fluorescent tubes, and/or high intensity discharge (HID) light bulbs. This shift to more energy efficient light fixtures is providing a noticeable cost savings to homeowners and business owners.

However, some energy efficient light fixtures cannot prevent some forms of inefficient energy usage. For example, a person may turn on a light in a room. While intending to turn off the light when leaving the room, the person may forget to do so and the light may remain on until the person returns to the room. As another example, a parking garage or stairway may only need lighting when a person is present. Installing energy efficient light fixtures can reduce the amount of energy consumed in such a situation, but the amount of energy consumed may still be unacceptably high.

SUMMARY OF CERTAIN INVENTIVE ASPECTS

As described above, energy efficient light fixtures can reduce the amount of energy wasted when a person accidentally leaves a light on, but the amount of energy wasted may still be unacceptably high. Accordingly, a motion sensor is described herein that includes the capability of communicating wirelessly with a user device, such as a mobile phone, laptop, tablet, desktop, and/or the like, such that the motion sensor settings can be adjusted via an application running on the user device. The motion sensor settings may determine when one or more light sources (e.g., a light fixture, a light bulb, an LED, etc.) turns on and the amount of light produced by the one or more light sources. Because of this, the motion sensor settings can be configured in a manner that reduces the amount of energy wasted when a light is turned on in an unoccupied room. Thus, the wireless communications capability of the motion sensor allows a user to quickly and easily increase energy efficiency in a building or other structure.

One aspect of the disclosure provides a motion sensor device. The motion sensor device comprises a motion sensor configured to detect motion of an object; a wireless communications device coupled to the motion sensor, where the wireless communications device is configured to communicate with a user device over a wireless network to receive motion sensor settings; and a controller coupled to the motion sensor and the wireless communications device, where the controller is further coupled to a 0-10V driver dimming wire. The controller is configured to receive information indicative of a first motion sensor setting from the wireless communications device, where the first motion sensor setting indicates a change to a light output level of a light source from a first light output level to a second light output level selected by a user via an application running on the user device; receive a signal from the motion sensor indicating that motion of the object is detected; generate a second signal to instruct the light source to operate at the second light output level based on the signal from the motion sensor and the first motion sensor setting; and transmit the second signal to the light source via the 0-10V driver dimming wire to cause the light source to turn on at the second light output level.

The motion sensor device of the preceding paragraph can have any sub-combination of the following features: where the controller is further configured to receive a second motion sensor setting, a third motion sensor setting, a fourth motion sensor setting, and a fifth motion sensor setting from the wireless communications device; where the second motion sensor setting indicates a first period of time, where the third motion sensor setting indicates a light output level of the light source after the first period of time has passed, where the fourth motion sensor setting indicates a second period of time, and where the fifth motion sensor setting indicates a light output level of the light source after the second period of time has passed; where the controller is further configured to: generate a third signal to instruct the light source to dim to the light output level indicated by the third motion sensor setting in response to a determination that the first period of time has passed, transmit the third signal to the light source via the 0-10V driver dimming wire to cause the light source to dim to the light output level indicated by the third motion sensor setting, generate a fourth signal to instruct the light source to dim to the light output level indicated by the fifth motion sensor setting in response to a determination that the second period of time has passed after the first period of time has passed, and transmit the fourth signal to the light source via the 0-10V driver dimming wire to cause the light source to dim to the light output level indicated by the fifth motion sensor setting; where the controller is further coupled to an active wire coupled to a power source, and where the controller is further configured to: generate a third signal to instruct the light source to dim to the light output level indicated by the third motion sensor setting in response to a determination that the first period of time has passed, transmit the third signal to the light source via the 0-10V driver dimming wire to cause the light source to dim to the light output level indicated by the third motion sensor setting, generate a fourth signal to shut off the light source in response to a determination that the second period of time has passed after the first period of time has passed, and transmit the fourth signal to a relay via the active wire, where the fourth signal causes the relay to prevent electrical current generated by the power source from passing to the light source; where the motion sensor device further comprises a light sensor coupled to the controller, where the light sensor is configured to measure a level of ambient light; where the controller is further configured to generate the second signal in response to a determination that the level of ambient level measured by the light sensor does not exceed a threshold value; where the controller is further configured to: receive an indication that a night mode is enabled, receive, after the night mode is enabled, a third signal from the motion sensor indicating that motion of the object is detected, receive a fourth signal from the light sensor that the level of ambient light measured by the light sensor is below a threshold value, generate a fifth signal to instruct the light source to turn on at a third light output level that is less than the second light output level, and transmit the fifth signal to the light source via the 0-10V driver dimming wire to cause the light source to turn on at the third light output level; where the motion sensor device is configured to receive power from a power source; where the light output level of the light source when motion is initially detected is initially set at the first light output level prior to reception of the information indicative of the first motion sensor setting; where a light fixture comprises the motion sensor device, the light source, and a housing enclosing the light source and the motion sensor device; and where the motion sensor is at least one of a passive infrared sensor, a microwave sensor, an ultrasonic sensor, or a complementary metal-oxide-semiconductor (CMOS) sensor.

Another aspect of the disclosure provides a sensor device comprising an occupancy sensor; a wireless communications device configured to wirelessly receive occupancy sensor setting data; a 0-10V driver dimming wire; a controller in communication with the occupancy sensor and the wireless communications device; and a housing enclosing the occupancy sensor, the wireless communications device, and the controller, where the light source is external to the housing, and where the 0-10V driver dimming wire provides an electrical connection from the sensor device to the light source. The controller is configured to: adjust a setting of the occupancy sensor based on the occupancy sensor setting data; generate dimming data for a light source; and transmit the dimming data to the light source via the 0-10V driver dimming wire.

The sensor device of the preceding paragraph can have any sub-combination of the following features: where the sensor device further comprises one or more wires configured to provide a control signal external to the sensor device to enable dimming of the light source; where the occupancy sensor comprises at least one of a passive infrared sensor, a microwave sensor, an ultrasonic sensor, or a complementary metal-oxide-semiconductor (CMOS) sensor; where the wireless communications device is a Bluetooth communication device; where the setting of the occupancy sensor comprises at least one of a motion sensitivity or a lux level; where the controller is configured to adjust the setting of the occupancy sensor to override a preset setting of the occupancy sensor; where a light fixture comprises the sensor device, the light source, and a second housing enclosing the light source and the sensor device; and where the occupancy sensor setting data is indicative of a dimming level of the light source, and where the controller is configured to adjust the dimming data for the light source based on the occupancy sensor setting data.

Another aspect of the disclosure provides a sensor device comprising an occupancy sensor; a wireless communications device configured to wirelessly receive control data for a light source; a 0-10V driver dimming wire; a controller in communication with the occupancy sensor and the wireless communications device; and a housing enclosing the occupancy sensor, the wireless communications device, and the controller, wherein the light source is external to the housing, and wherein the 0-10V driver dimming wire provides an electrical connection from the sensor device to the light source. The controller is configured to generate dimming data for the light source based on occupancy data from the occupancy sensor and the control data for the light source; and transmit the dimming data to the light source via the 0-10V driver dimming wire.

The sensor device of the preceding paragraph can have any sub-combination of the following features: where the wireless communications device is a Bluetooth communication device; where the controller is further configured to adjust a setting of the occupancy sensor based on occupancy sensor setting data received via the wireless communications device; and where a light fixture comprises the sensor device, the light source, and a second housing enclosing the light source and the sensor device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF CERTAIN EMBODIMENTS

Figure 1:
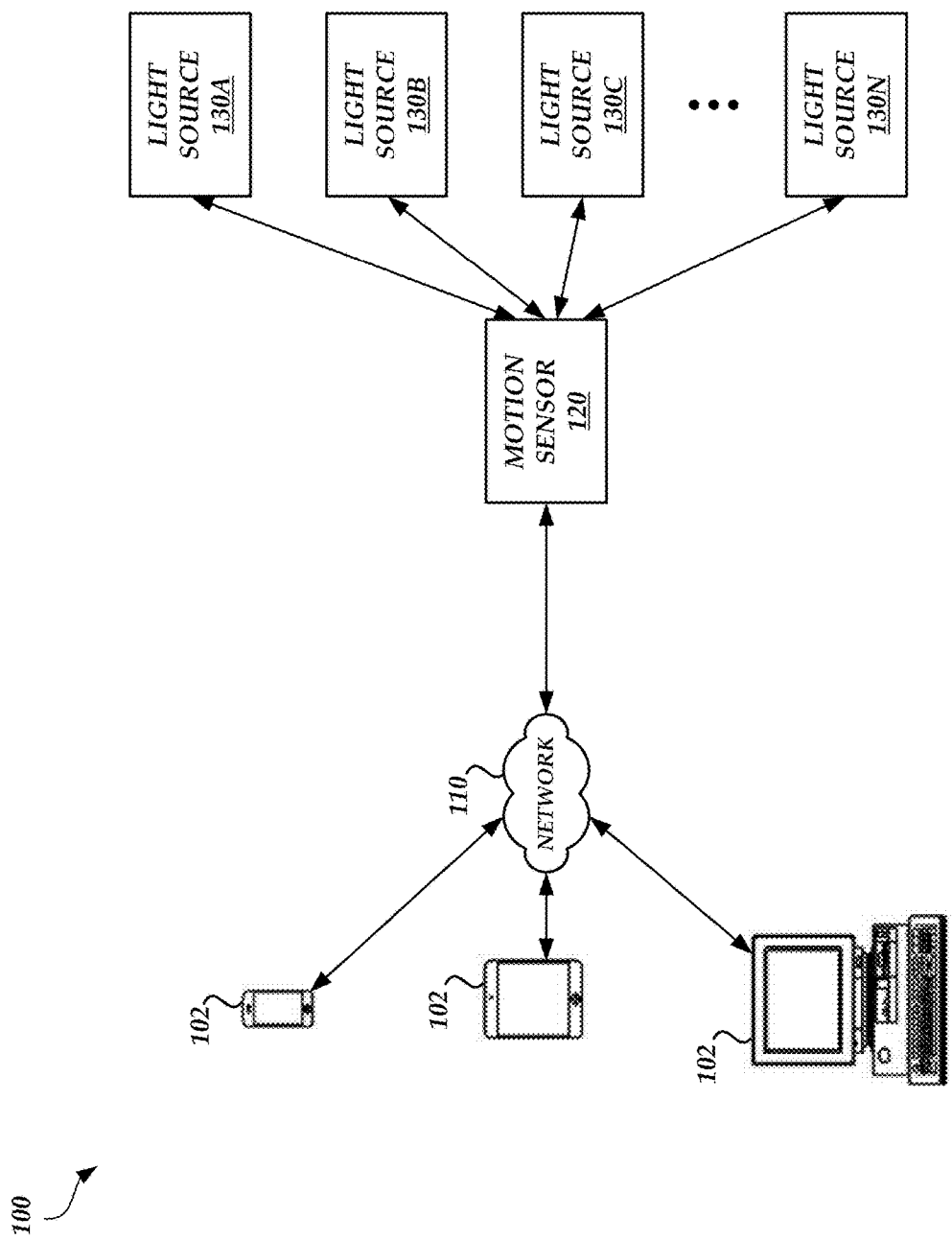
FIG. 1 illustrates a lighting control environment that includes a motion and/or occupancy sensor that controls one or more light sources based on a configuration provided by a user device, according to one embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claimed invention.

Introduction

As described above, energy efficient light fixtures can reduce the amount of energy wasted when a person accidentally leaves a light on, but the amount of energy wasted may still be unacceptably high. Thus, motion sensors can be installed to detect when a person is present in a room or general area. For example, a person can turn on the light using a switch. The motion sensor can be used to detect movement or the presence of a person and, if no movement or presence is detected after a certain amount of time has passed, the motion sensor can dim the light and/or switch the light off.

Certain motion sensors are generally installed into a wall, a ceiling, or integrated into a light fixture installed in a wall or ceiling. Because some motion sensors are usually installed in building ceilings or high-mounted light fixtures, it tends to be difficult to access the motion sensor after installation. Thus, adjusting motion sensor settings can be a cumbersome process. This can be problematic in situations in which a person would like to adjust the functionality of the motion sensor based on the time of day, how the room is being used, and/or other varying personal preferences.

Accordingly, a motion sensor is described herein that includes the capability of communicating wirelessly with a user device, such as a mobile phone, laptop, tablet, desktop, and/or the like, such that the motion sensor settings can be adjusted via an application running on the user device. In certain applications, the motion sensor settings can be settings associated with sensing motion of an object. Alternatively or additionally, the motion sensor settings can be associated with taking action in response to detecting motion of an object and/or in response to not detecting motion of an object for a period of time. The motion sensor settings may determine when one or more light sources (e.g., a light fixture, a light bulb, a light emitting diode (LED), etc.) turns on and/or the amount and/or intensity of light produced by the one or more light sources. Accordingly, the motion sensor settings can be configured in a manner that reduces the amount of energy consumed when a light is turned on in an unoccupied room. Thus, the wireless communications capability of the motion sensor allows a user to quickly and easily increase energy efficiency in a building or other structure.

For example, the motion sensor can be coupled to a light source. A user, via an application running on the user device (e.g., a mobile application), can determine how the light source operates by adjusting the settings of the motion sensor. Such settings can include a light output level of the light source when motion is first detected, a light output level of the light source if motion is not detected after a first period of time, the length of time that corresponds to the first period of time, a light output level of the light source if motion is not detected after a second period of time once the first period of time has passed, the length of time that corresponds to the second period of time, the sensitivity of the motion sensor, and/or the like.

In an embodiment, once the user has configured the motion sensor, the motion sensor operates as follows. When motion is first detected, the motion sensor can turn the light source on (e.g., to a light output level of 100% or any other percentage selected by a user). If no motion is then detected after the first period of time, the motion sensor can dim the light source to a first level (e.g., to a light output level of 50% or any other percentage selected by the user). Once the light source is dimmed to the first level, if no motion is then detected after the second period of time (which can be the same length of time as the first period of time), the motion sensor can dim the light source to a second level that is lower than the first level (e.g., to a light output level of 20% or any other percentage selected by the user) or completely turn off the light source. If motion is detected at any point, the motion sensor can turn the light source back on (e.g., to the light output level of 100% of any other percentage selected by the user). The user can intervene at any point to manually set the light output level of the light source as well. Thus, the user can indirectly control the operation of the light source by remotely communicating with the motion sensor to configure the motion sensor settings.

The motion sensor settings may also include an ambient light setting. The ambient light setting may be a lux level that determines whether any detected motion causes the light source to turn on (or causes an increase in the light output level of the light source). For example, a user may not want the light source to turn on if there is enough ambient light present in a room or general area such that artificial light is unnecessary. The motion sensor can measure the amount of ambient light present and if this amount is greater than the selected lux level, then the motion sensor may not turn on the light source even if motion is detected.

To enable the functionality described above, the motion sensor can be constructed with certain components. For example, a communication printed circuit board (PCB) that includes components for communicating with a user device (e.g., a Bluetooth transceiver, a Wi-Fi transceiver, a ZigBee transceiver, etc.) can be coupled to a motion sensor PCB that includes components for detecting motion (e.g., a motion detection sensor, such as a passive infrared (PIR) sensor, a microwave sensor, an ultrasonic sensor, a complementary metal-oxide-semiconductor (CMOS) sensor, and/or any combination thereof (where a combination of two or more may be referred to as a "dual tech" sensor), etc.). Both PCBs can then be included within a single housing to form the motion sensor. The motion sensor housing may further include a light sensor (e.g., a photo diode, a photo transistor, etc.) that detects ambient light levels.

The motion sensors described herein may provide benefits over typical motion sensors and/or light sources. For example, some light sources are integrated with wireless communications capabilities such that a user can use a remote device to turn on or off a particular light source. However, integrating wireless communications capabilities with the light source does not solve the problem described above of how to reduce energy usage when a light is left on after a room or other area is left vacant. Even if a motion sensor is installed to control a light source that has integrated wireless communications capabilities, the user would not have access to the motion sensor for the purpose of achieving greater energy consumption reduction. Generally, a motion sensor outputs signals, such as via a 0-10V driver dimming wire or an active high/low wire, to a light source to control the light source. These wires, though, only carry one-way traffic—from the motion sensor to the light source. If a user wanted to use wireless communications to interact with a motion sensor, the motion sensor and/or the light source would have to be modified to receive and transmit additional data (e.g., via the installation of additional wires from the light source to the motion sensor). This could result in a costly and complicated redesign of the structure to accommodate the additional electrical infrastructure for making these communications possible. The motion sensor described herein can be installed in place of any available motion sensor without any redesign of the structure or a light source. The motion sensor described herein can use the existing electrical infrastructure of a structure, such as the 0-10V driver dimming wire and/or the active high/low wire, to control operation of a light source. How the motion sensor described herein can achieve this benefit is described in greater detail below.

As another example, some motion sensors are configured with infrared receivers such that the motion sensors can be controlled with an infrared-enabled remote control. However, unlike the motion sensor and application described herein, these motion sensors and remote controls provide limited user feedback. For example, the remote control includes no user interface to provide the user with an indication of current motion sensor settings. Also, infrared can require a direct line of sight between the remote control and the motion sensor. In many cases, a user may not be positioned in a manner such that the user has a direct line of sight with the motion sensor. Thus, unlike using a user device, which does not typically require any direct line of sight with a motion sensor to communicate with the motion sensor, using a remote control can be inconvenient for users.

Moreover, in addition to using detected motion to determine whether a user is present, the motion sensor described herein can use information related to whether a wireless connection with the user device is active or terminated to determine user presence and control operation of the light source accordingly. Motion sensors that rely on infrared-enabled remote controls, though, have no additional means of detecting user presence other than via the motion sensor itself. Furthermore, the same remote control can control any motion sensor with an infrared receiver. This can be problematic in situations in which a user has a direct line of sight with multiple motion sensors, but would only like to adjust the settings of one motion sensor. The motion sensor and application described herein, on the other hand, allow a user to select which motion sensor the user would like to communicate with.

As another example, the transceiver included in the communication PCB may be associated with a unique hardware address (e.g., a unique medium access control (MAC) address), meaning that the motion sensor can be individually addressable. This means that the motion sensor can then be connected to any Internet of Things (IoT) device (e.g., an electronic device that can collect and/or exchange data via a network and/or that can be sensed or controlled remotely via a network) and itself can function as an IoT device. This also allows the user to individually select a motion sensor to update, as described above.

As another example, by means of the transceiver described above, a user device with an application installed allows a user to supersede the typical functionality of a motion sensor to instead enable the user device to act as a real-time digital dimmer. Any light sources to which the motion sensor is connected can then be remotely dimmed with precision to any light output level allowed by those particular light sources. These light sources can then also be turned on and off via the user device rather than via a traditional light switch.

As another example, the application running on the user device can include security features, such as password protection and/or encryption. Thus, it may be difficult for unauthorized users to take control and modify motion sensor settings.

As another example, the communication PCB and the motion sensor PCB are integrated within a single housing, meaning that the motion sensor described herein can be installed without any modification to existing light sources. In fact, by being integrated within a single housing separate from the light source, the motion sensor described herein can control a plurality of light sources at once. Others may try to integrate a light source, a motion sensor, and a communication PCB within a single housing, but then a single motion sensor cannot be used to control a plurality of light sources. Installing multiple motion sensors, one for each light source, can be costly. In addition, a user would have to individually adjust the settings for each motion sensor, which can be inconvenient and time consuming.

While the disclosure provided herein is directed to a standalone motion sensor separate from a light source that can be coupled to various light sources, some other embodiments can be implemented in different contexts. In other embodiments, a motion sensor with integrated wireless communications capabilities can be integrated within a light source in a single housing. This integrated motion sensor and light source may communicate with other light sources that do not have integrated motion sensors to coordinate operation of the light sources based on motion detected by the motion sensor in a manner as described herein. For example, the integrated motion sensor and light source may have a 0-10V driver dimming wire and/or an active high/low wire that extends from the housing and couples to the other light sources. The integrated motion sensor and light source can output signals via the wire(s) to control the other light sources in a manner as described herein.

In addition, while the disclosure provided herein is directed to a standalone motion sensor that includes an embedded communication device, this is not meant to be limiting. The communication device can be external to the housing of the motion sensor and the motion sensor can still function as described herein. Furthermore, the standalone device can be any occupancy sensor, such as a motion sensor, heat sensor (e.g., measures changes in temperature to identify movement), presence sensor, camera (e.g., to detect user movement), and/or the like.

System Components

FIG. 1 illustrates a lighting control environment that includes a motion and/or occupancy sensor 120 that controls one or more light sources 130A-N based on a configuration provided by a user device 102, according to one embodiment. The lighting control environment shown in FIG. 1 includes various user devices 102, the motion sensor 120, and various light sources 130A-N. The lighting control environment may include any suitable number of distinct user devices 102, motion sensors 120, and/or light sources 130A-N.

The various user devices 102 may communicate with the motion sensor 120 via one or more communication networks 110. The network 110 may include a private network, personal area network, local area network, wide area network, cable network, satellite network, cellular telephone network, etc. or combination thereof. The network 110 may have access to and/or from the Internet. For example, the network 110 may be a network that carries data packets packaged according to the Bluetooth protocol, an IEEE 802.11 protocol, the ZigBee protocol, and/or the like.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute an application, such as a mobile application, to communicate with the motion sensor 120 via the network 110. Aspects of the present disclosure enable the adjustment of motion sensor settings and the indirect control of various light sources 130A-N on a wide variety of devices, such that the presence of a specific type or version of application on a given user device 102 is generally not a limitation of the systems and methods described herein, provided that the application is capable of processing and/or executing the type of code utilized in a given embodiment.

Illustratively, a user may use the application running on the user device 102 to adjust motion sensor settings of the motion sensor 120. For example, the motion sensor settings can include a light output level of a light source 130 when motion is first detected, a light output level of the light source 130 if motion is not detected after a first period of time, the length of time that corresponds to the first period of time, a light output level of the light source 130 if motion is not detected after a second period of time once the first period of time has passed, the length of time that corresponds to the second period of time, the sensitivity of the motion sensor, an ambient light lux level (e.g., a threshold ambient light value), and/or the like.

The motion sensor 120 can be a PIR motion sensor, a microwave motion sensor, an ultrasonic motion sensor, a CMOS motion sensor, and/or any combination thereof with wireless network communications capabilities. For example, the motion sensor 120 can include a communication PCB that includes components for communicating with the user device 102 (e.g., a Bluetooth transceiver, a Wi-Fi transceiver, etc.) and a motion sensor PCB that includes components for detecting motion (e.g., a motion detection sensor, such as a PIR sensor, a microwave sensor, an ultrasonic sensor, a CMOS sensor, and/or any combination thereof, etc.). The communication PCB can be coupled to the motion sensor PCB, as described in greater detail below. Both PCBs can be included within a single housing to form the motion sensor 120. The motion sensor 120 housing may further include a light sensor (e.g., a photo diode, a photo transistor, etc.) that detects ambient light levels. Although features may be described herein in connection with a motion sensor 120 for illustrative purposes, any suitable principles and advantages discussed herein can be implemented in connection with an occupancy sensor that can detect occupancy. An occupancy sensor can be any suitable sensor arranged to detect whether an area (e.g., a room) is occupied. In some instances, an occupancy sensor is a motion sensor that can detect occupancy based on a detecting motion. In other instances, an occupancy sensor is a heat sensor (e.g., measures changes in temperature to identify movement), a presence sensor, a camera (e.g., to detect user movement), and/or the like.

If the motion sensor 120 is a PIR motion sensor, the motion sensor 120 may be a bi-level dimming PIR sensor used in ceiling mount, high bay, and/or low bay applications. For example, the PIR motion sensor 120 is coupled to a 0-10V driver dimming wire (described below) that couples the PIR motion sensor 120 to the light source 130A-N. When the PIR motion sensor 120 detects motion, the PIR motion sensor 120 can transmit a signal to the light source 130A-N via the 0-10V driver dimming wire to output light at 100% lumen or light output level. When the PIR motion sensor 120 has not detected motion for a first period of time (e.g., 5 seconds, 5 minutes, 10 minutes, 15 minutes, 30 minutes, etc.), the PIR motion sensor 120 can transmit a signal to the light source 130A-N to dim the lighting to a specific level (e.g., 25% lumen output, 50% lumen output, 75% lumen output, etc.). When the PIR motion sensor 120 has not detected motion for a second period of time after the first period of time has expired (e.g., 10 seconds, 30 minutes, 45 minutes, 60 minutes, etc.), the PIR motion sensor 120 can transmit a signal to the light source 130A-N to shut off the light source 130A-N (e.g., reduce the light output to 0% lumen output). Alternatively, the PIR motion sensor 120 can be configured to never shut off the light source 130A-N no matter how long the PIR motion sensor 120 has not detected motion after the first period of time has expired. The PIR motion sensor 120 may be structured such that the PIR motion sensor 120 is suitable for a variety of indoor and outdoor applications, including supporting fixture (e.g., light fixture) and/or ceiling mounts (e.g., the PIR motion sensor 120 can be embedded within a fixture and/or ceiling mount).

If the motion sensor 120 is a microwave motion sensor, the motion sensor 120 may be a bi-level dimming microwave sensor that emits microwaves at a certain frequency (e.g., 10.525 GHz) and uses the Doppler shift of the return or reflected waves to detect motion. For example, the microwave motion sensor 120 may implement bi-level dimming as described above with respect to the PIR motion sensor 120. The microwave motion sensor 120 may be structured such that the microwave motion sensor 120 is suitable for a variety of indoor and outdoor applications, including supporting fixture (e.g., light fixture) and/or ceiling mounts (e.g., the microwave motion sensor 120 can be embedded within a fixture and/or ceiling mount).

If the motion sensor 120 is an ultrasonic motion sensor, the motion sensor 120 may be a bi-level dimming ultrasonic sensor that emits a high frequency sound wave (e.g., 40 kHz) and uses the Doppler Effect to detect motion. For example, the ultrasonic motion sensor 120 may implement bi-level dimming as described above with respect to the PIR motion sensor 120. The ultrasonic motion sensor 120 may be structured such that the ultrasonic motion sensor 120 is suitable for a variety of indoor and outdoor applications, including supporting fixture (e.g., light fixture) and/or ceiling mounts (e.g., the ultrasonic motion sensor 120 can be embedded within a fixture and/or ceiling mount).

The motion sensor 120 can have a default setting (e.g., set by a manufacturer or a user). The motion sensor 120 may also include physical components for making physical adjustments to the settings of the motion sensor 120. For example, the motion sensor 120 can include one or more dip switches, trimpots, trimmers, etc. to enable a user to make physical adjustments to the settings of the motion sensor 120 (e.g., physical adjustments to the range of detection of the motion sensor 120, the first period of time, the second period of time, etc.).

The motion sensor 120 can communicate with the light sources 130A-N via wired or wireless communications. For example, a 0-10V driver dimming wire and/or an active high/low wire (also referred to as a motion high/low wire, which produces a motion high signal or a motion low signal, or a control high/low wire, which produces a control high signal or a control low signal) can extend outward from a housing of the motion sensor 120. The motion sensor 120 can output signals along the wire(s) to control one or more of the light sources 130A-N, as described in greater detail below.

The light sources 130A-N can be any device that generates light. For example, a light source 130 can include a light fixture (e.g., a ceiling light fixture, a chandelier, a fan light fixture, a pendant, a recessed light fixture, a utility light fixture, a wall light fixture, etc.), an incandescent light bulb, a compact fluorescent (CFL) light bulb, a light emitting diode (LED), a linear fluorescent tube, a high intensity discharge (HID) light bulb, and/or the like. The light sources 130A-N can receive control signals from the motion sensor 120 (e.g., via the 0-10V driver dimming and/or active high/low wires) for controlling the operation of the respective light source 130A-N.

In some embodiments, the motion sensor 120 and the light sources 130A-N are installed within the same structure (e.g., within the same room in a structure). The user device 102, however, may be physically located at any location in which the user device 102 can establish communications with the motion sensor 120 via the network 110. For example, the user device 102 can be physically located in the same room as the motion sensor 120. Alternatively, the user device 102 can be located in a different room than the motion sensor 120 (e.g., but within a distance of the motion sensor 120 such that data packets transmitted by the user device 102 can reach the motion sensor 120 and/or data packets transmitted by the motion sensor 120 can reach the user device 102). In other embodiments, the motion sensor 120 and the light sources 130A-N are not installed within the same structure. For example, the motion sensor 120 may be integrated within an exterior wall of a building and the light sources 130A-N may be physically located outside the building.

Example Motion Sensor

Figure 2A:
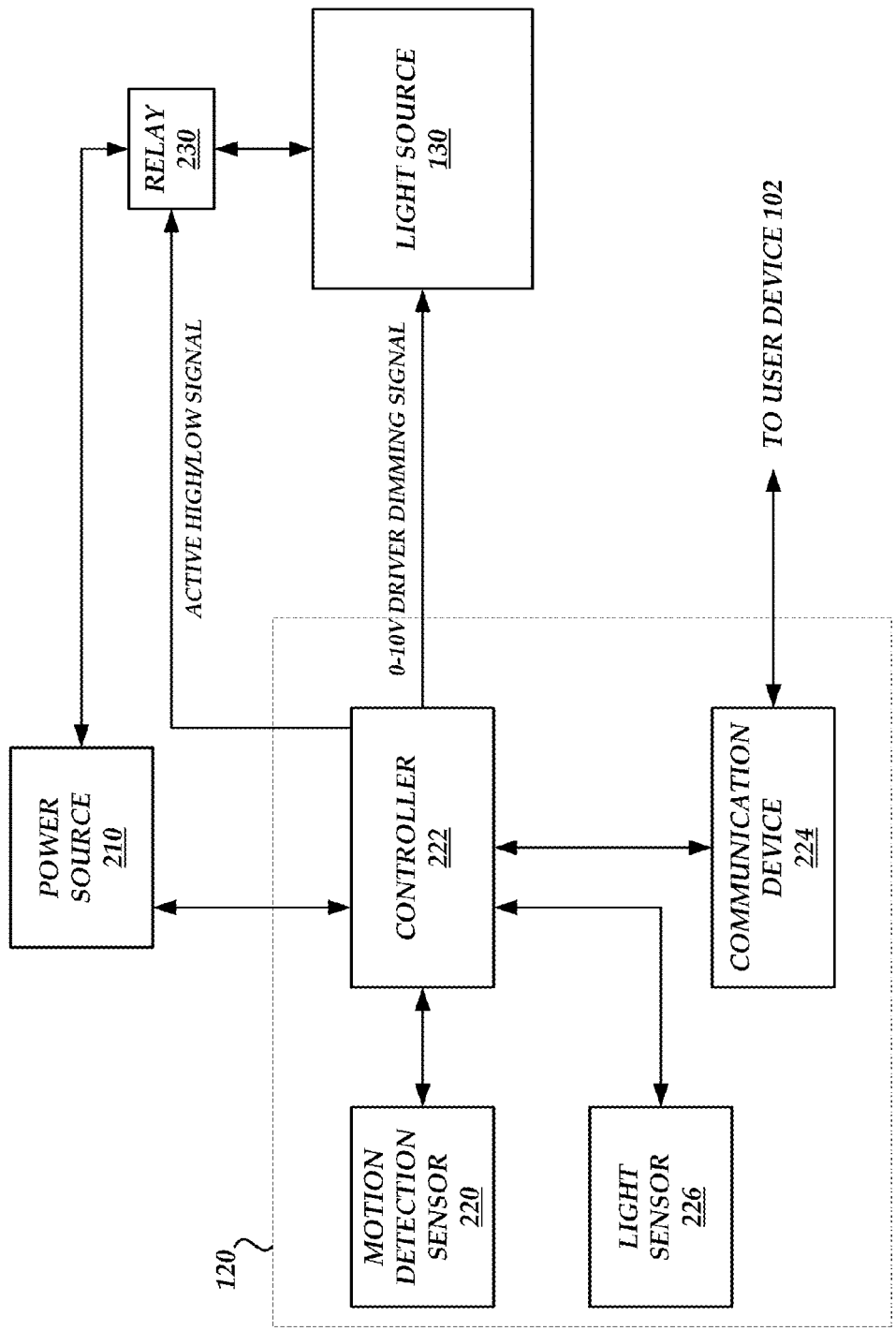
FIG. 2A illustrates a block diagram of the motion sensor and the components coupled to the motion sensor, according to one embodiment.

FIG. 2A illustrates a block diagram of the motion sensor 120 and the components coupled to the motion sensor 120, according to one embodiment. As illustrated in FIG. 2A, the motion sensor 120 is coupled to a power source 210 and the light source 130. In some embodiments, the motion sensor 120 and the light source 130 are also coupled to a relay 230. For example, the power source 210 can provide power to the light source 130 via the relay 230 and/or to the motion sensor 120. The power source 210 can be an electrical grid within a structure, an electrical socket, a renewable energy source (e.g., a solar voltaic cell or group of cells, a wind turbine, a hydroelectric facility, etc.), a battery, a power pack, and/or the like. The relay 230 can be a switch.

The motion sensor 120 can include various physical components. For example, the motion sensor 120 can include a motion detection sensor 220, a controller 222, a communication device 224, and a light sensor 226. The motion sensor PCB may include the motion detection sensor 220, the controller 222, and the light sensor 226 and the communication PCB may include the communication device 224. The communication PCB may be an optional daughter board that can plug in to the motion sensor PCB without any modifications to the components on the motion sensor PCB (e.g., the motion sensor 120 can be used to detect movement even if the communication PCB is removed). The motion detection sensor 220 can be a PIR sensor, a microwave sensor, an ultrasonic sensor, a CMOS sensor, and/or any combination thereof. The motion detection sensor 220 can be configured to detect motion of an object (e.g., a user) and indicate to the controller 222 when motion is detected.

The communication device 224 can be configured to communicate wirelessly with a user device 102 via the network 110 or with another motions sensor 120 via the network 110 (e.g., another motion sensor 120 in the lighting control environment, such as another motion sensor 120 configured to control another light source 130, that is not physically housed within the same enclosure as the present motion sensor 120 and/or that is not physically located at the same location as the present motion sensor 120). The communication device 224 can include an antenna to receive wireless signals from a user device and/or other motion sensor 120 and/or to transmit wireless signals to the user device and/or other motion sensor 120. The communication device 224 can include a transceiver (e.g., a Bluetooth transceiver, a Wi-Fi transceiver, etc.) and related circuitry to enable the buffering, transmission, and reception of data packets. The communication device 224 can receive motion sensor setting data and/or occupancy sensor setting data from the user device and can receive motion detection information from another motion sensor 120. The communication device 224 can process received data packets and transmit relevant information to the controller 222. Such relevant information can include a value for a motion sensor setting, the user device 102 attempting to access the motion sensor 120, whether another motion sensor 120 detected motion, and/or the like. The communication device 224 can also process information received from the controller 222 (e.g., confirmation that a motion sensor setting is changed, a value of a current motion sensor setting, motion sensor statistics and/or characteristics, whether motion is detected, etc.) and generate data packets for transmission of such information to the user device 102 and/or other motion sensor 120.

The light sensor 226 can be configured to detect a lux level of ambient light present at the physical location of the motion sensor 120. For example, the light sensor 226 can be a photo diode, a photo transistor, and/or the like. The light sensor 226 can transmit the detected lux level to the controller 222 so that the controller 222 can use the detected lux level to determine whether enough ambient light is present to warrant disabling the light source 130. The controller 222 can also use the detected lux level to modify the light output level of the light source 130. For example, while ambient light may be present, the level of ambient light may not be high enough to warrant a complete disabling of the light source 130. Thus, the ambient light can be harvested to augment the light produced by the light source 130. In particular, if the controller 222 determines that the light output level of the light source 130 should be at a first level (e.g., 80%) given the situation (e.g., motion is detected, motion has not been detected for a first period of time, motion has not been detected for a second period of time after the first period of time has passed, etc.), then the controller 222 can lower the light output level from the first level (e.g., 80%) to a second level (e.g., 60%) that is less than the first level by an amount corresponding to the detected lux level (e.g., the detected lux level may be at 200 lux, which may correspond to a light output level of 20%). In practice, the controller 222 may cause the light source 130 to output light at the second level by lowering the voltage output along the 0-10V driver dimming wire (e.g., from 8V to 6V). Thus, the location may still be illuminated at the first level, just that a portion of the light contributing to the first level may be from ambient light rather than the light source 130.

In further embodiments, the light sensor 226 can transmit the detected lux level to the controller 222 so that the controller 222 can use the detected lux level to determine whether a lack of sufficient ambient light warrants the enabling of the light source 130. For example, the motion sensor 120 and/or light fixture 250 (described below) can operate in a night mode, which can be enabled automatically (e.g., at preset times) and/or manually by a user via the application running on the user device 102. If the night mode is enabled, the motion detection sensor 220 can indicate to the controller 222 that motion is detected, and the light sensor 226 can indicate to the controller 222 that the detected lux level is below a threshold value (e.g., a lux level indicating darkness or near darkness, such as 10.8 lux, 1.08 lux, 0.108 lux, 0.0108 lux, 0.0011 lux, 0.0001 lux, etc.), then the controller 222 can cause the light source 130 to output light at a relatively low light output level (e.g., 5%, 10%, 15%, etc. or any suitable level that is lower than a typical light output level for a lux condition above the threshold value). This may be beneficial in situations in which an occupant is getting out of bed at night or is otherwise entering a dark space. In certain applications, by configuring the controller 222 to cause the light source 130 to output light at a low light output level, the occupant may not suffer the immediate brightness of full light output, other occupants in the room who may be sleeping may not be awakened, and the occupant may be able to safely navigate the space and return to bed without the night vision rhodopsin being bleached from the occupant's eyes.

The controller 222 can use information received from the motion detection sensor 220, the communication device 224, and the light sensor 226 to determine whether the light source 130 should be enabled and, if so, the amount of light that the light source 130 should output. The techniques implemented by the controller 222 to make these determinations are described in greater detail below with respect to FIG. 3. If the controller 222 determines that the light source 130 should be enabled and/or should be enabled at a specific dim level, then the controller 222 can cause the light source 130 to output light at the determined levels via the 0-10V driver dimming wire. For example, the controller 222 can output a 0-10V driver dimming signal via the 0-10V driver dimming wire, where the 0-10V driver dimming signal specifies the light output level of the light source 130. As described herein, the light output level can range from 0% or 0V (e.g., the light source 130 produces no light) to 100% or 10V (e.g., the light source 130 produces a maximum amount of light allowed by its components). The controller 222 can adjust one or more settings of the motion sensor 220 based on the motion sensor setting data received by the communication device 224.

If the controller 222 determines that the light source 130 should be shut off, then the controller 222 can cause the light source 130 to output no light via the 0-10V driver dimming wire (e.g., by specifying the light output level to be 0% or 0V). Alternatively or in addition, the controller 222 can cause the light source 130 to output no light via an active high/low wire. For example, the controller 222 can output an active high/low signal via the active high/low wire. When the signal is high (e.g., a logical "1"), the relay 230 may be enabled such that electrical current flows between the power source 210 and the light source 130 (e.g., to provide power to the light source 130). When the signal is low (e.g., a logical "0"), the relay 230 may be disabled such that no electrical current flows between the power source 210 and the light source 130 (and thus the light source 130 produces no light). Accordingly, the motion sensor 120 can prevent the light source 130 from receiving any power when the controller 222 determines that the light source 130 should be shut off. In some embodiments, the active/high low wire allows for communication with external low voltage control systems. Other control systems (e.g., third party control systems) can make use of the active high/low signals exiting the motion sensor 120. For example, such signals can be used to provide information for data collection. Alternatively, the active/high low signal can be used to turn on and/or off motions or other power systems unrelated to lighting.

Figure 2B:
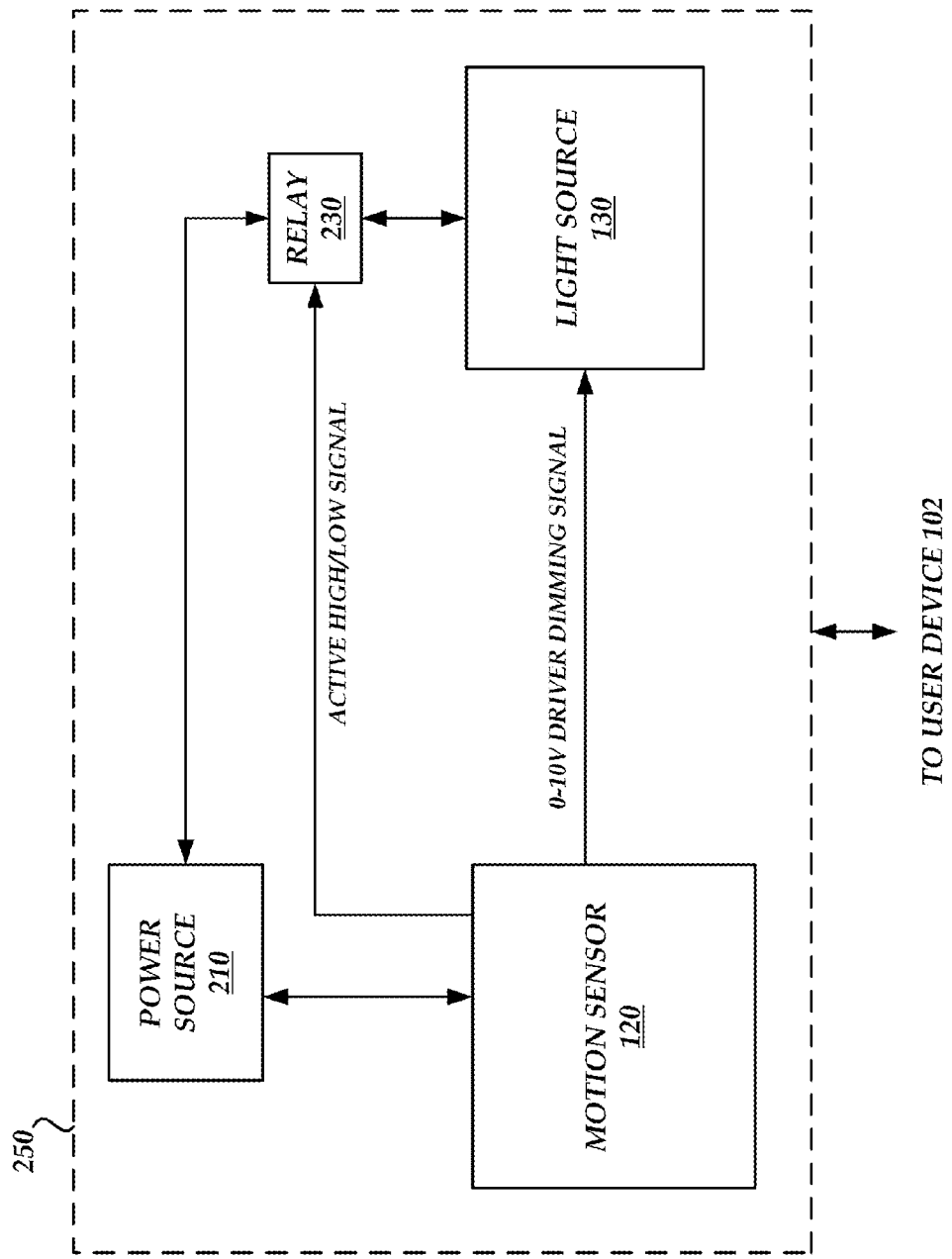
FIG. 2B illustrates a block diagram of the light fixture or luminaire that includes an integrated motion sensor, according to one embodiment.

FIG. 2B illustrates a block diagram of the light fixture or luminaire 250 that includes an integrated motion sensor 120, according to one embodiment. As illustrated in FIG. 2B, the light fixture 250 includes the motion sensor 120, the light source 130, the power source 210, and the relay 230. For example, the light fixture 250 may include a housing that encloses the motion sensor 120, the light source 130, the power source 210, and/or the relay 230. The light fixture 250 may be mounted, coupled, or attached to a ceiling, wall, or other like feature of a building or similar structure.

While FIG. 2B illustrates the power source 210 and the relay 230 as being included within the light fixture 250, the power source 210 and/or the relay 230 can be external to the light fixture 250 in some embodiments.

Figure 2C:
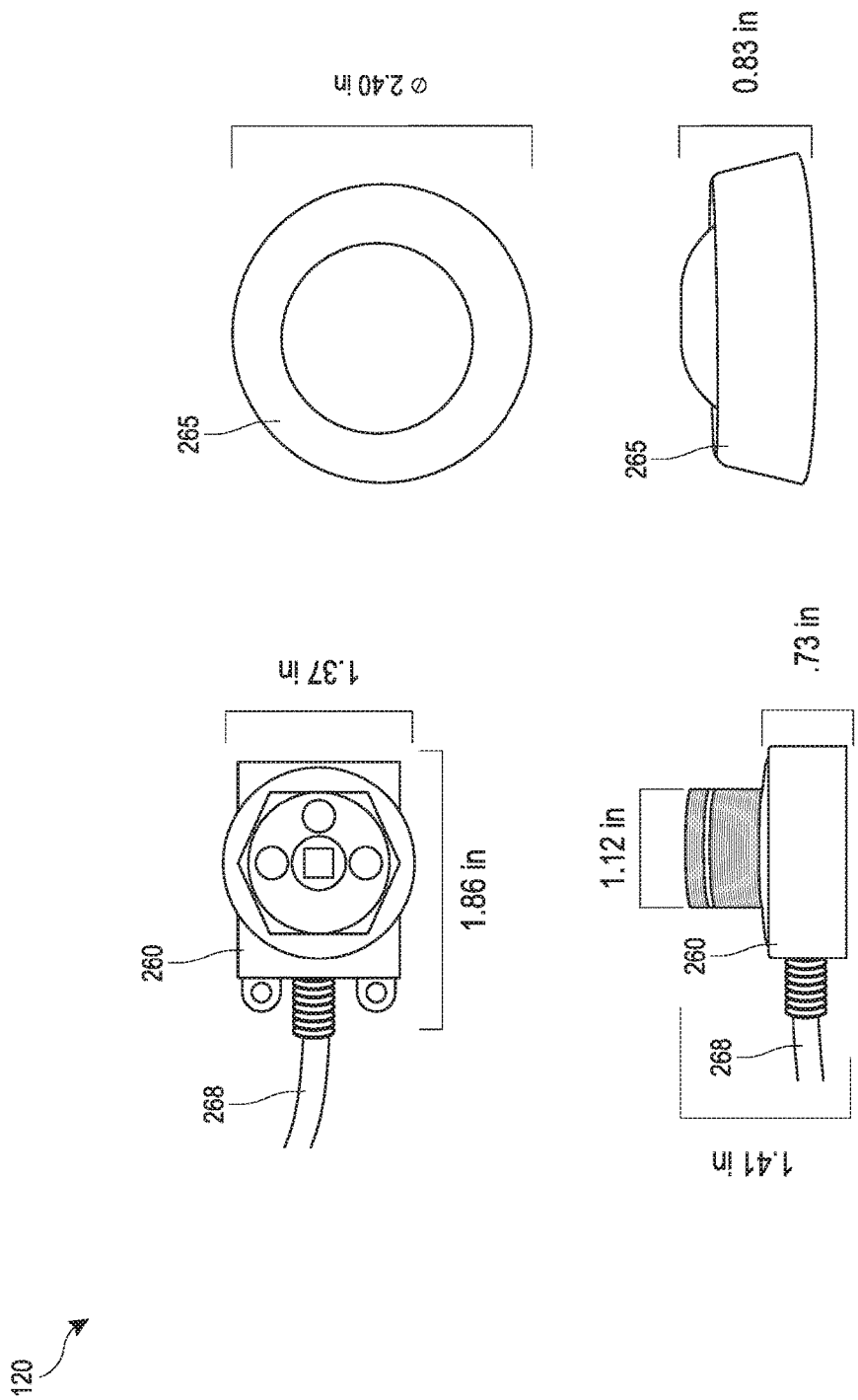
FIG. 2C illustrates an example schematic and diagram of a PIR motion sensor, according to one embodiment.

FIG. 2C illustrates an example schematic and diagram of a PIR motion sensor 120. As illustrated in FIG. 2C, the PIR motion sensor 120 includes a housing 260 that encloses the motion detection sensor 220, the controller 222, the communication device 224 and the light sensor 226. The housing 260 of the PIR motion sensor 120 may optionally be enclosed within a lens cover 265. Cable 268 extending from the housing 260 may include the active/high low wire and/or the 0-10V driver dimming wire. While FIG. 2C illustrates dimensions of the PIR motion sensor 120, this is merely for illustrative purposes. The PIR motion sensor 120 can be constructed to be smaller or larger than depicted.

Figure 2D:
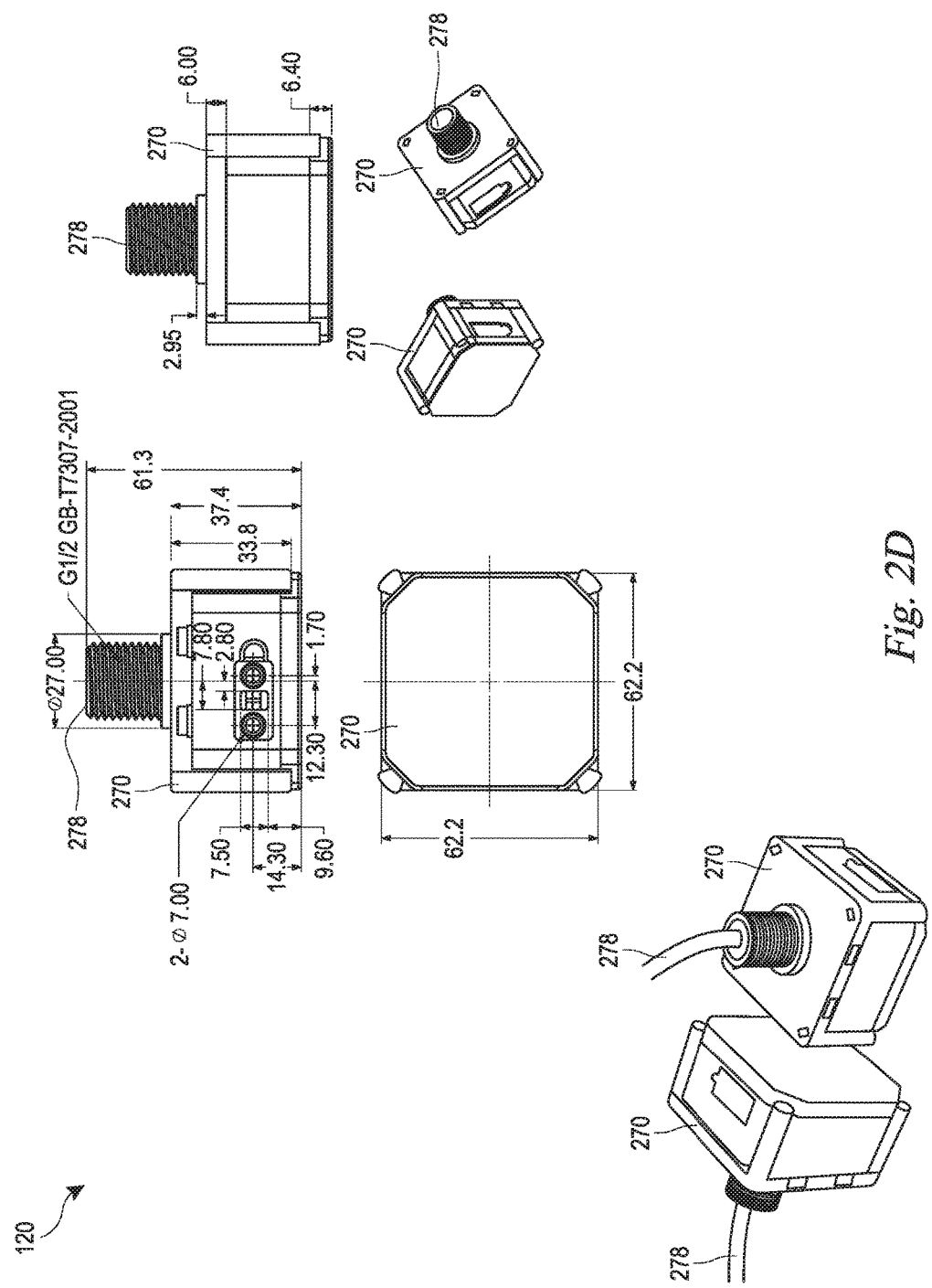
FIG. 2D illustrates an example schematic and diagram of a microwave motion sensor, according to one embodiment.

FIG. 2D illustrates an example schematic and diagram of a microwave motion sensor 120. As illustrated in FIG. 2D, the microwave motion sensor 120 includes a housing 270 that encloses the motion detection sensor 220, the controller 222, the communication device 224 and the light sensor 226. Cable 278 extending from the housing 270 may include the active/high low wire and/or the 0-10V driver dimming wire. While FIG. 2D illustrates dimensions of the microwave motion sensor 120, this is merely for illustrative purposes. The microwave motion sensor 120 can be constructed to be smaller or larger than depicted.

Figure 2E:
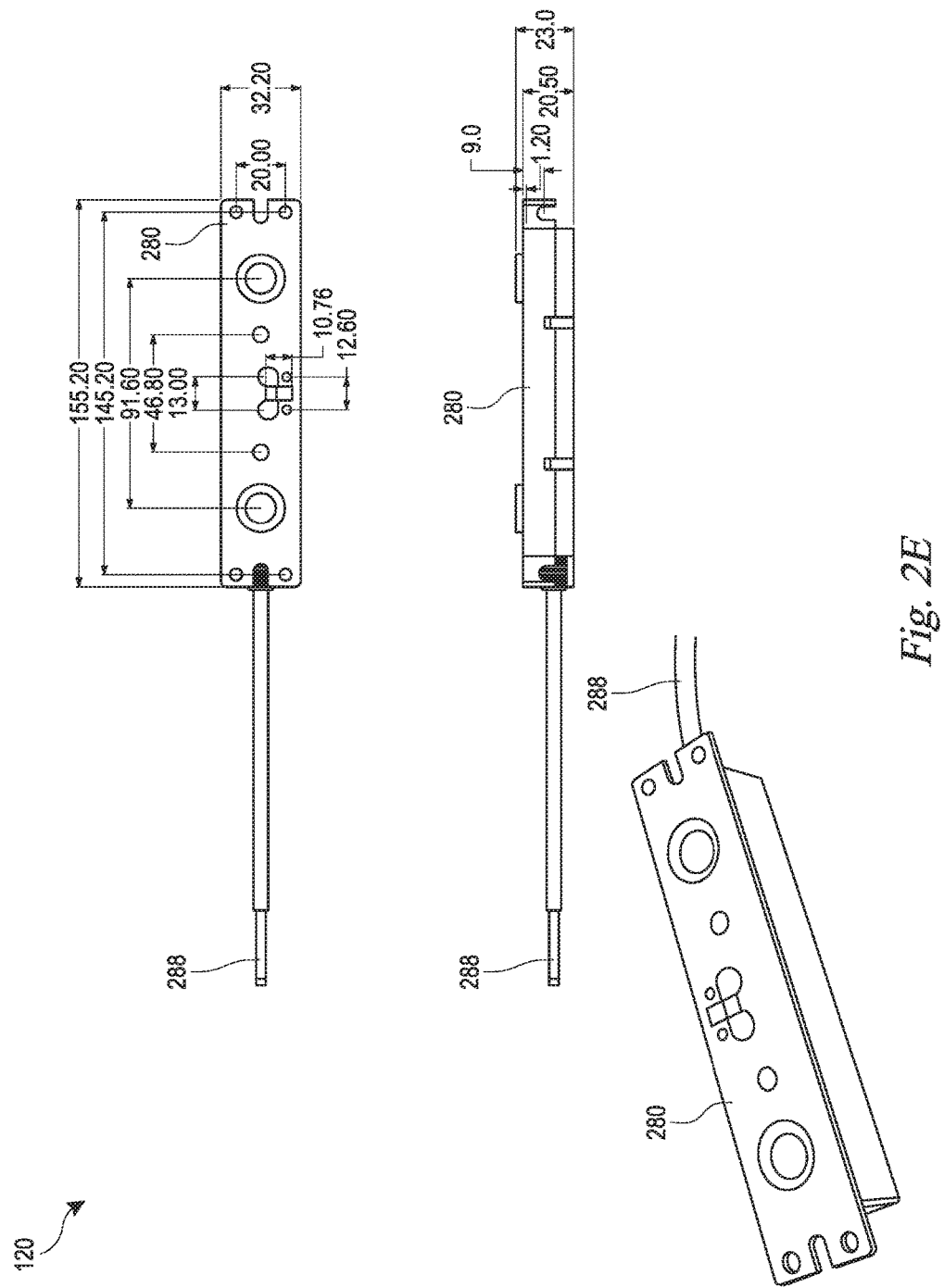
FIG. 2E illustrates an example schematic and diagram of an ultrasonic motion sensor, according to one embodiment.

FIG. 2E illustrates an example schematic and diagram of an ultrasonic motion sensor 120. As illustrated in FIG. 2E, the ultrasonic motion sensor 120 includes a housing 280 that encloses the motion detection sensor 220, the controller 222, the communication device 224 and the light sensor 226. Cable 288 extending from the housing 280 may include the active/high low wire and/or the 0-10V driver dimming wire. While FIG. 2E illustrates dimensions of the ultrasonic motion sensor 120, this is merely for illustrative purposes. The ultrasonic motion sensor 120 can be constructed to be smaller or larger than depicted.

Example Process for Controlling Operation of a Light Source

Figure 3:
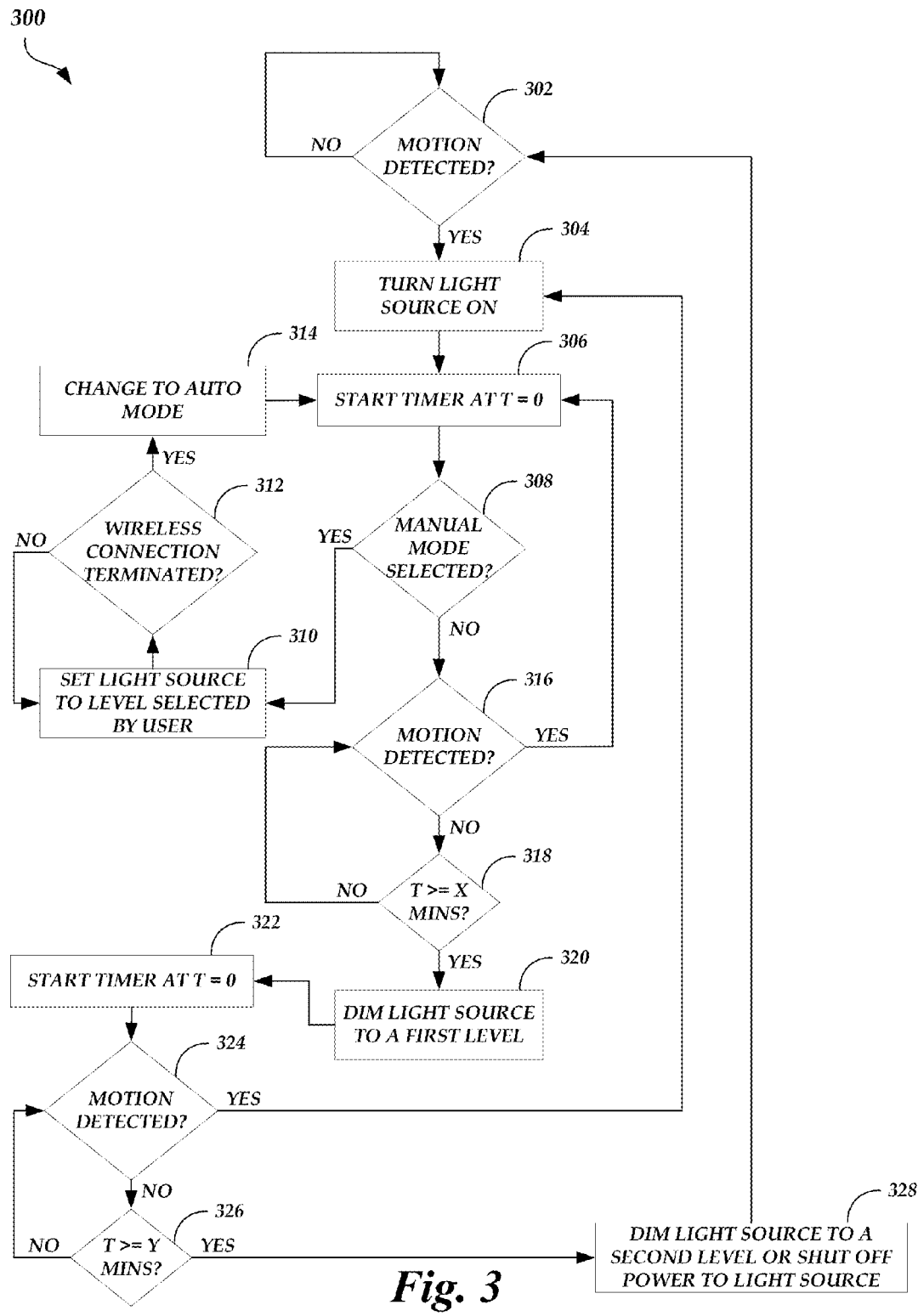
FIG. 3 illustrates an exemplary process for controlling operation of the light source, according to one embodiment.

FIG. 3 illustrates an exemplary process 300 for controlling operation of the light source 130, according to one embodiment. As an example, the motion sensor 120 of FIG. 1 (e.g., the controller 222 of FIG. 2A) can be configured to execute the process 300. The process 300 begins at block 302.

At block 302, a determination is made as to whether motion is detected. For example, the controller 222 may receive a message from the motion detection sensor 220 if motion of an object is detected. If no motion is detected, the process 300 returns to block 302. Otherwise, the process 300 proceeds to block 304.

At block 304, a light source is turned on. For example, the controller 222 can turn the light source 130 on by sending an active high signal to the relay 230 (e.g., if the controller 222 had previously sent an active low signal to the relay 230) and/or by sending a voltage along the 0-10V driver dimming wire that exceeds a threshold value (e.g., exceeds 1V, where a voltage between 0V and 1V results in the light source 130 not outputting any light) and that corresponds with a desired light output level (e.g., 10V if 100% light output is desired and/or set by the user via the user device 102). The process 300 then proceeds to block 306.

In additional embodiments, not shown, the light source 130 is not immediately turned on if motion is detected. Rather, the controller 222 may analyze the lux level of the ambient light measured by the light sensor 226. If the lux level exceeds a threshold value (e.g., specified by the user via the application running on the user device 102), then the process 300 does not proceed to block 304 (e.g., the light source is not turned on because there is enough ambient light present in the area surrounding the motion sensor 120) and the process 300 reverts back to block 302 (e.g., if the process 300 was previously at block 302) or proceeds to block 326 (e.g., if the process 300 was previously at block 324). If the lux level does not exceed a threshold value, then the process 300 proceeds to block 304 as described herein (e.g., the light source 130 is turned on because there is not enough ambient light present in the area surrounding the motion sensor 120). As described above, if the lux level does not exceed the threshold value and a night mode is enabled, then the light source 130 may be turned on at a low light output level (e.g., 5%, 10%, 15%, etc.). Otherwise, if the night mode is not enabled, the light source 130 may be turned on at a default light output level (e.g., 80%, 100%, etc.).

In an embodiment, not shown, the light source 130 is turned on by the controller 222 if motion is detected by the motion detection sensor 220 of the present motion sensor 120 and if motion is detected by a motion detection sensor 220 of another motion sensor 120 (e.g., another motion sensor 120 that communicates with the present motion sensor 120 via the network 110 and that is not physically housed within the same enclosure as the present motion sensor 120 and/or that is not physically located at the same location as the present motion sensor 120). If the other motion sensor 120 transmits a signal to the communication device 224 of the present motion sensor 120 indicating that the other motion sensor 120 detected motion, then the process 300 proceeds to block 304 (e.g., because now both the present motion sensor 120 and the other motion sensor 120 have detected motion). If, however, the other motion sensor 120 transmits a signal to the communication device 224 of the present motion sensor 120 indicating that no motion is detected by the other motion sensor 120 or no signal is received from the other motion sensor 120 (e.g., indicating that motion is not detected), then the process 300 reverts back to block 302 (e.g., if the process 300 was previously at block 302) or proceeds to block 326 (e.g., if the process 300 was previously at block 324). Thus, the light source 130 is turned on if the current motion sensor 120 detects motion (or occupancy) and another motion sensor 120 in networked communication with the present motion sensor 120 also detects motion (or occupancy). By relying on two motion sensors 120 detecting motion (or occupancy) before the light source 130 is turned on, false positives may be avoided. This embodiment can be combined with the embodiment disclosed in the previous paragraph (e.g., that a light source is not turned on if there is enough ambient light present in the area surrounding the motion sensor 120).

Alternatively, the light source 130 is turned on by the controller 222 if motion is detected by the motion detection sensor 220 of the present motion sensor 120 or if motion is detected by a motion detection sensor 220 of another motion sensor 120. If the other motion sensor 120 transmits a signal to the communication device 224 of the present motion sensor 120 indicating that the other motion sensor 120 detected motion and the process 300 would otherwise remain at block 302 or proceed to block 326 because the present motion sensor 120 has not detected any motion, then the process 300 instead proceeds to block 304 (e.g., because now at least one motion sensor 120 has detected motion). The process 300 also proceeds to block 304 if the present motion sensor 120 detects motion (e.g., at block 302 or block 324) regardless of whether the other motion sensor 120 detects motion. If, however, the other motion sensor 120 transmits a signal to the communication device 224 of the present motion sensor 120 indicating that no motion is detected by the other motion sensor 120 or no signal is received from the other motion sensor 120 (e.g., indicating that motion is not detected) and the process 300 would otherwise remain at block 302 or proceed to block 326 because the present motion sensor 120 has not detected any motion, then the process 300 reverts back to block 302 (e.g., if the process 300 was previously at block 302) or proceeds to block 326 (e.g., if the process 300 was previously at block 324). Thus, the light source 130 may be turned on if at least one of two (or more) motion sensors 120 detects motion (or occupancy). This embodiment can be combined with the embodiment disclosed above in which a light source is not turned on if there is enough ambient light present in the area surrounding the motion sensor 120.

At block 306, a timer is started at T equals 0. For example, the controller 222 can implement a timer (e.g., using registers or counters) that tracks an amount of time that has elapsed since the timer was started (e.g., referred to as the first period of time herein). The process 300 then proceeds to block 308.

At block 308, a determination is made as to whether a manual mode is selected. For example, the motion sensor 120 may operate under two possible modes: a manual mode and an automatic mode. The motion sensor 120 can operate under the manual mode when the user via the application running on the user device 102 bypasses a default operation of the motion sensor 120 and selects a current light output level of the light source 130 (e.g., indirectly controls the operation of the light source 130 via the motion sensor 120). In the manual mode, the motion sensor 120 still controls the operation of the light source 130 as described herein (e.g., via the 0-10V driver dimming or the active high/low wires). However, the user is provided with controls to directly manipulate the operation of the light source 130, such as dimming and turning on/off the light source 130. The motion sensor 120 can operate under the automatic mode when the user has not bypassed the default operation of the motion sensor 120 (e.g., where the automatic mode or default operation of the motion sensor 120 is represented by blocks 302, 304, 306, 316, 318, 320, 322, 324, 326, and 328). If the manual mode is selected, the process 300 proceeds to block 310. Otherwise, the process 300 proceeds to block 316.

At block 310, the output of the light source 130 is set to a level selected by the user via the application running on the user device 102. For example, when motion is detected, the motion sensor 120 may turn the light source 130 on at a 100% light output level. The user may find the light to be too bright, and thus may dim the light source 130 to an acceptable light output level (e.g., 80%) via the application. The process 300 then proceeds to block 312.

At block 312, a determination is made as to whether a wireless connection with the user device 102 is terminated. For example, the user via the application running on the user device 102 can manually adjust the light output level of the light source 130. However, the user, while carrying the user device 102, may step away from the motion sensor 120 by a distance that exceeds the transmission range of the user device 102 and/or the motion sensor 120. Thus, a wireless connection between the user device 102 and the motion sensor 120 may be terminated or disconnected. Upon this termination or disconnection, the light source 130 may revert back to the automatic mode (e.g., a default operation) given that the user is likely no longer present near the motion sensor 120 and/or the light source 130. Similarly, the user may terminate a connection with the motion sensor 120 because the user may no longer wish to control the light source(s) 130 coupled to the motion sensor 120. In additional embodiments, not shown, the motion sensor 120 may revert back to the automatic mode if no motion is detected within a threshold amount of time, even if the wireless connection has not been terminated or disconnected. If the wireless connection is terminated or disconnected, then the process 300 proceeds to block 314. Otherwise, the process 300 reverts back to block 310.

At block 314, the motion sensor 120 is changed back to automatic mode. In some embodiments, the light output levels set by the user remain until the process 300 reaches another block that changes the light output levels (e.g., the process 300 proceeds to block 306). In other embodiments, not shown, the light output levels revert back to light output levels associated with block 304 (e.g., the process 300 proceeds to block 304).

At block 316, a determination is made as to whether motion is detected. If no motion is detected, the process 300 proceeds to block 318. Otherwise, the process 300 reverts back to block 306 (e.g., the timer is reset). In additional embodiments, not shown, the process 300 further includes analyzing the lux level of the ambient light measured by the light sensor 226 and/or determining whether another motion sensor 120 has detected motion in a manner as described above before the process 300 proceeds to block 318 (e.g., there is enough ambient light present in the area surrounding the motion sensor 120, the other motion sensor 120 has not detected motion, etc.) or reverts to block 306 (e.g., there is not enough ambient light present in the area surrounding the motion sensor 120, the other motion sensor 120 has detected motion, etc.).

At block 318, a determination is made as to whether T exceeds a threshold length of time represented as X minutes (e.g., where X corresponds to a length of time associated with the first period of time described herein). If T exceeds X (e.g., the first period of time has passed), then the process 300 proceeds to block 320. Otherwise, the process 300 reverts back to block 316.

At block 320, the light source 130 is dimmed to a first level. The light source 130 may be dimmed because no motion has been detected for a first period of time. For example, the first level may be selected by the user via the application running on the user device 102. Generally, the first level may be less than the light output level associated with block 304 to reduce energy waste. The process 300 then proceeds to block 322.

At block 322, a timer is started at T equals 0. For example, the controller 222 can implement a timer (e.g., using registers or counters) that tracks an amount of time that has elapsed since the timer was started (referred to as the second period of time herein). The process 300 then proceeds to block 324.

At block 324, a determination is made as to whether motion is detected. If no motion is detected, the process 300 proceeds to block 326. Otherwise, the process 300 reverts back to block 304 (and the light source 130 thus changes from outputting light at the first level to outputting light at the light output level associated with block 304).

At block 326, a determination is made as to whether T exceeds a threshold length of time represented as Y minutes (e.g., where Y corresponds to a length of time associated with the second period of time described herein, and where Y can equal X). If T exceeds Y (e.g., the second period of time has passed), then the process 300 proceeds to block 328. Otherwise, the process 300 reverts back to block 324.

At block 328, the light source 130 is dimmed to a second level or power to the light source 130 is shut off. The light source 130 may be dimmed again (or shut off) because no motion has been detected continuously for the first period of time and for a second period of time after the first period of time passed. For example, the second level may be selected by the user via the application running on the user device 102 (and can be 0%, which would cause the light source 130 to be shut off). Generally, the second level may be less than the light output level associated with block 304 and the first level to reduce energy waste. The process 300 then proceeds to block 302 and the process 300 is repeated.

Example User Interfaces

FIGS. 4-17 illustrate example user interfaces 400, 500, 600, 700, 800, 900, 1000, 1100, 1200, 1300, 1400, 1500, 1600, and 1700 for adjusting motion sensor settings and indirectly controlling the light source 130, according to one embodiment. The user interface s 400, 500, 600, 700, 800, 900, 1000, 1100, 1200, 1300, 1400, 1500, 1600, and 1700 may be generated by the application running on the user device 102 and can be displayed on a screen of the user device 102.

Figure 4:
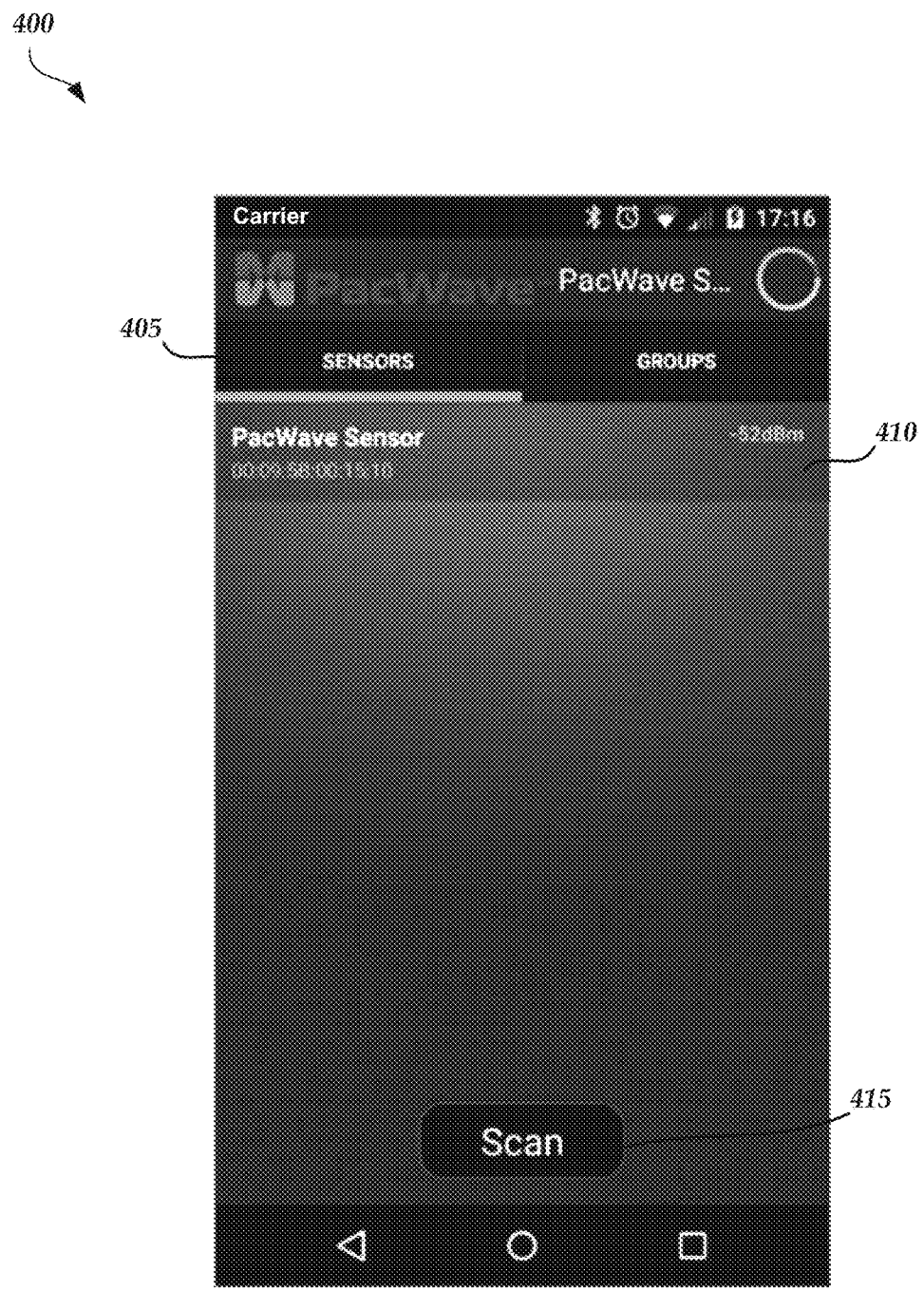
FIG. 4 illustrates an example user interface listing motion sensors that a user device has paired with or otherwise established a connection with, according to one embodiment.
Figure 5:
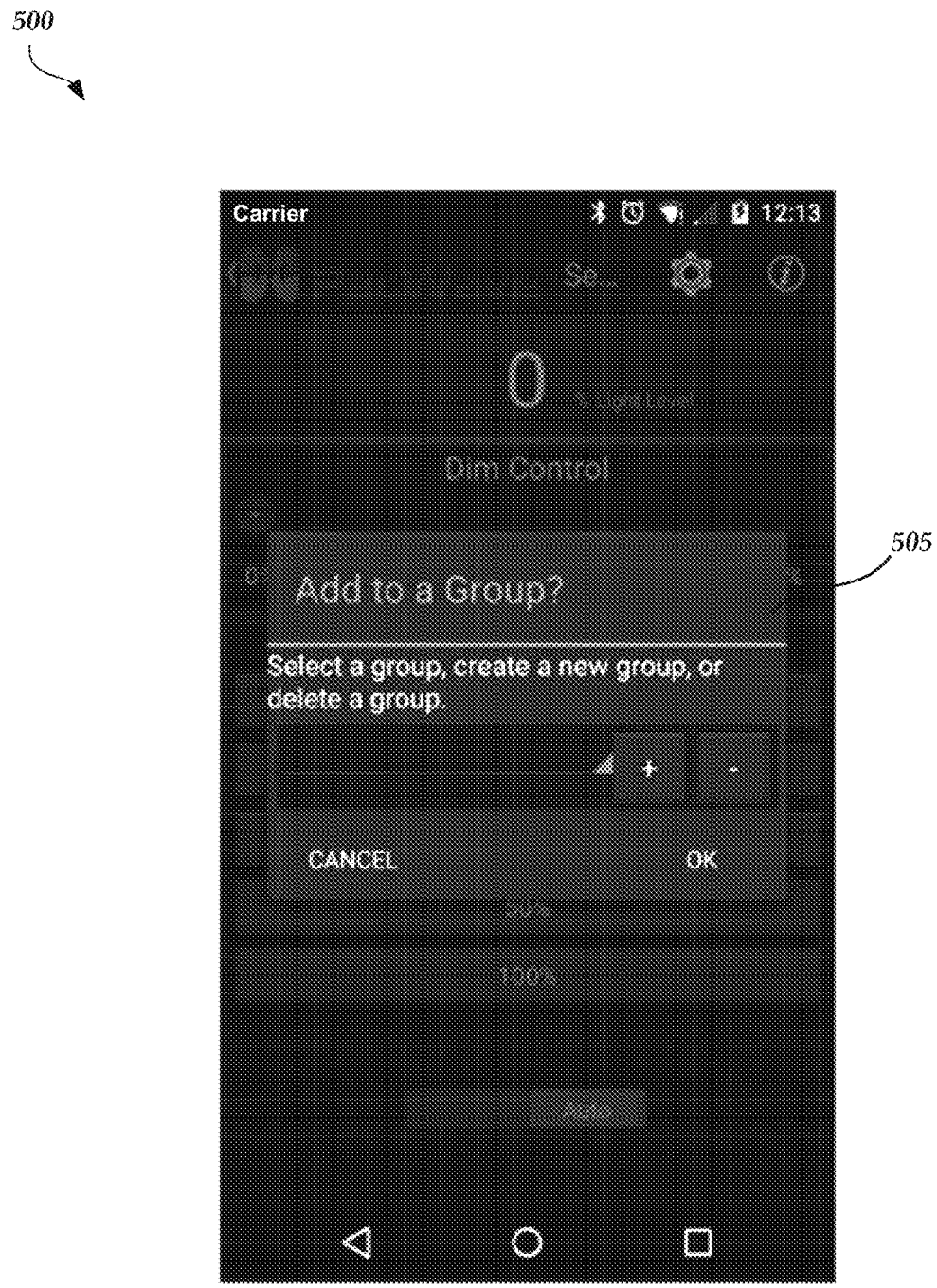
FIG. 5 illustrates an example user interface providing an option to select, create, or delete groups, according to one embodiment.

As illustrated in FIG. 4, the user interface 400 includes a sensors tab 405 that, when selected, lists motion sensors 120 that the user device 102 has paired with or otherwise established a connection with. For example, the user device 102 has established a connection with one motion sensor 120, as indicated in row 410.

In addition, the user interface 400 includes a scan button 415 that, when selected by the user, allows the user device 102 to scan for nearby motion sensors 120. For example, the motion sensor 120 can periodically transmit a beacon signal to identify itself and invite user devices 102 to connect. The user device 102 can scan for such beacon signals to identify nearby motion sensors 120 and allow the user to connect to some or all identified motion sensors 120.

In an embodiment, a user can group one or more motion sensors 120 together. For example, motion sensors 120 associated with a specific structure or room can be grouped together. As illustrated in window 505 in FIG. 5, the user interface 500 provides an option to select, create, or delete groups.

Figure 6:
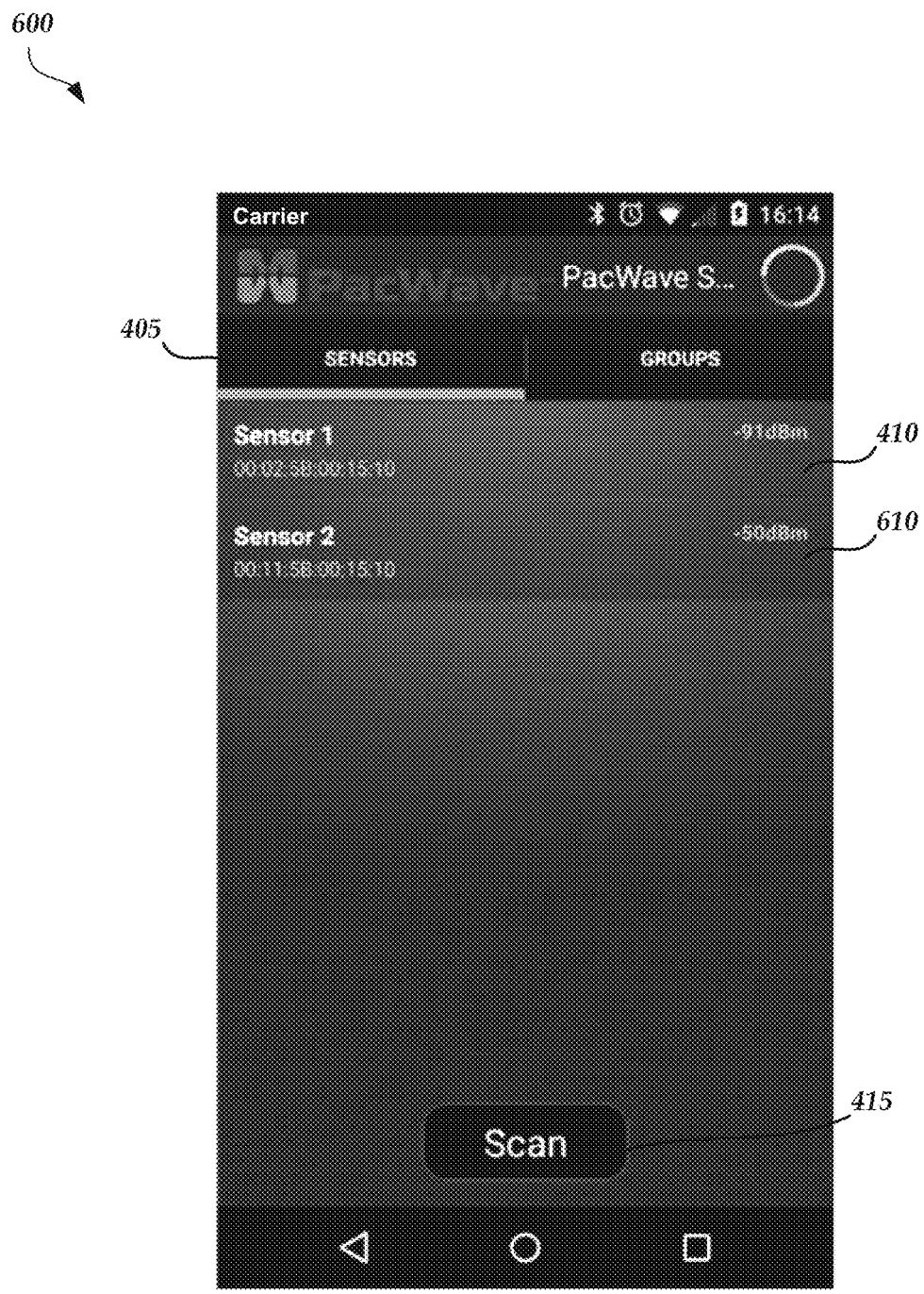
FIG. 6 illustrates an example user interface listing a new motions sensor that a user device has established a connection with, according to one embodiment.

As illustrated in FIG. 6, the user device 102 has established a connection with a second motion sensor 120, as indicated in row 610. The first and second motion sensors 120 can be grouped into the same group or into different groups. Each of the rows 410 and 610 may also indicate a motion sensitivity level of each motion sensor 120 for easy comparison.

Figure 7:
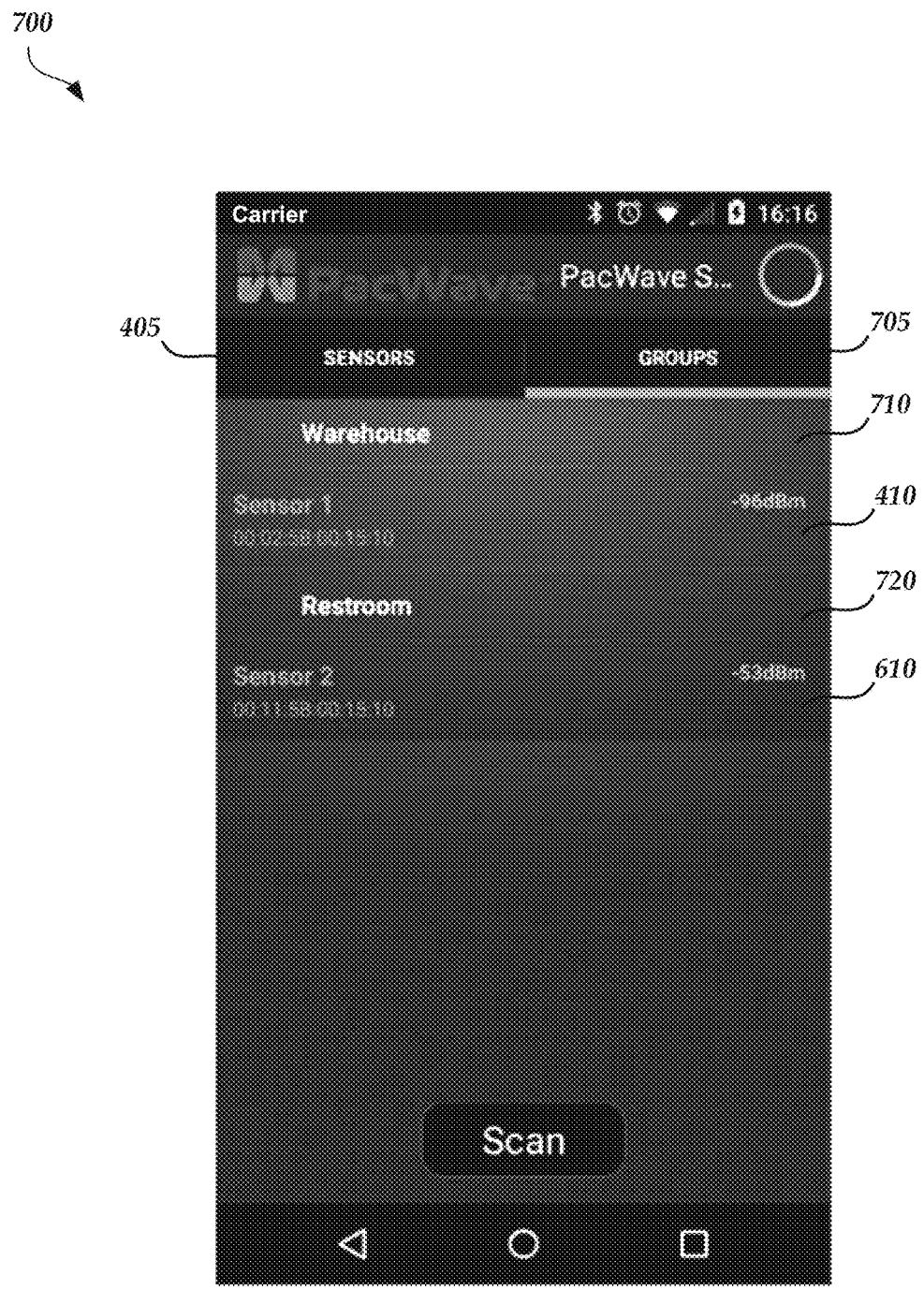
FIG. 7 illustrates an example user interface that organizes listed motion sensors by group, according to one embodiment.

As illustrated in FIG. 7, the user interface 700 includes a groups tab 705 that, when selected, organizes listed motion sensors 120 by group. For example, two groups are created representing physical locations: Warehouse group 710 and Restroom group 720. The first motion sensor 120 is organized under the Warehouse group 710 and the second motion sensor 120 is organized under the Restroom group 720.

Figure 8A:
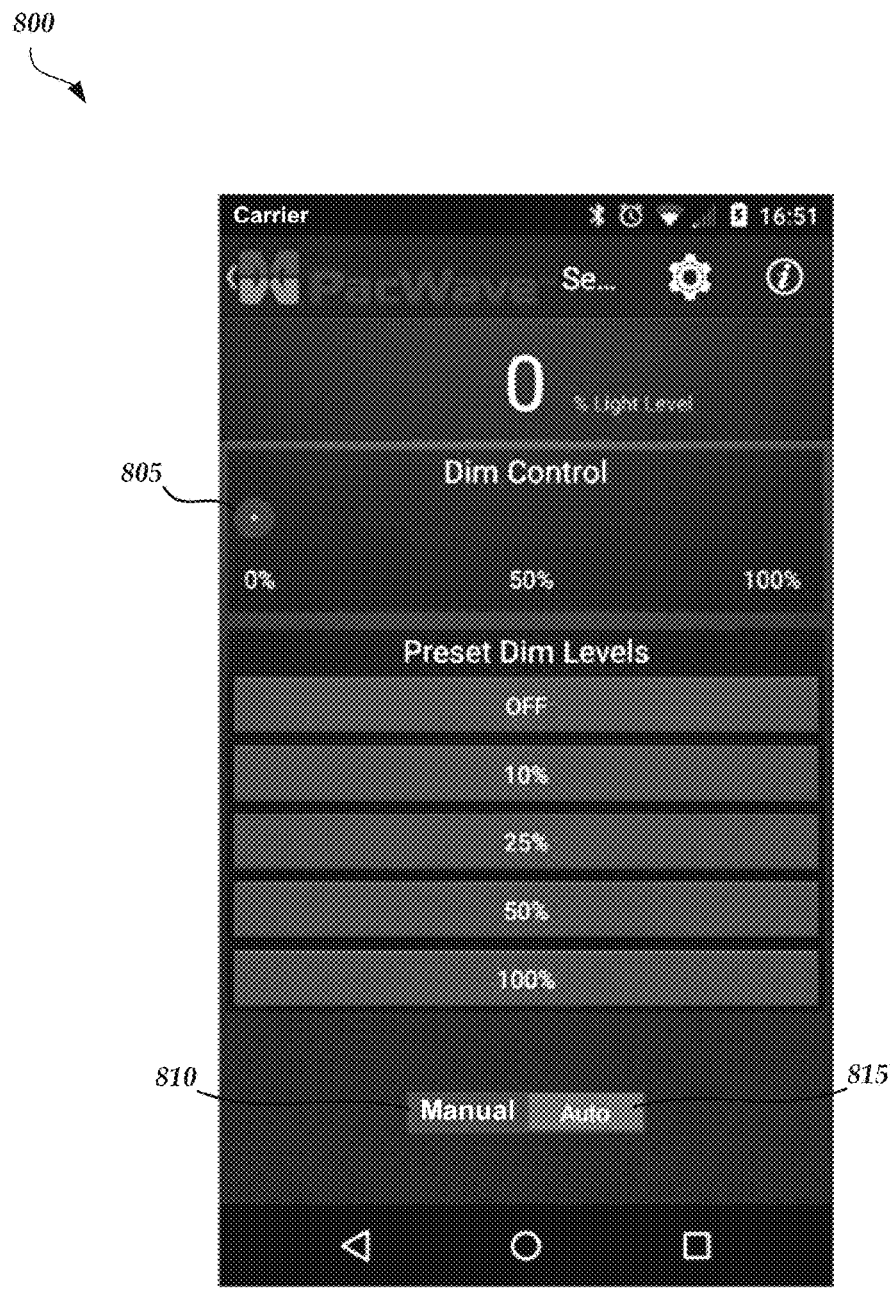
FIG. 8A illustrates an example user interface indicating that a motion sensor is operating in an automatic mode, according to one embodiment.

As described above, the motion sensor 120 may initially operate in the automatic mode. As illustrated in FIG. 8A, the user interface 800 indicates that the motion sensor 120 is operating in the automatic mode, as indicated by button 815. However, the user can enter the manual mode by, for example, adjusting the light output level of the light source via the selection of a preset dim level (e.g., off or 0%, 10%, 25%, 50%, 100%, etc.) or via the movement of slider 805 to a desired light output level.

Figure 8B:
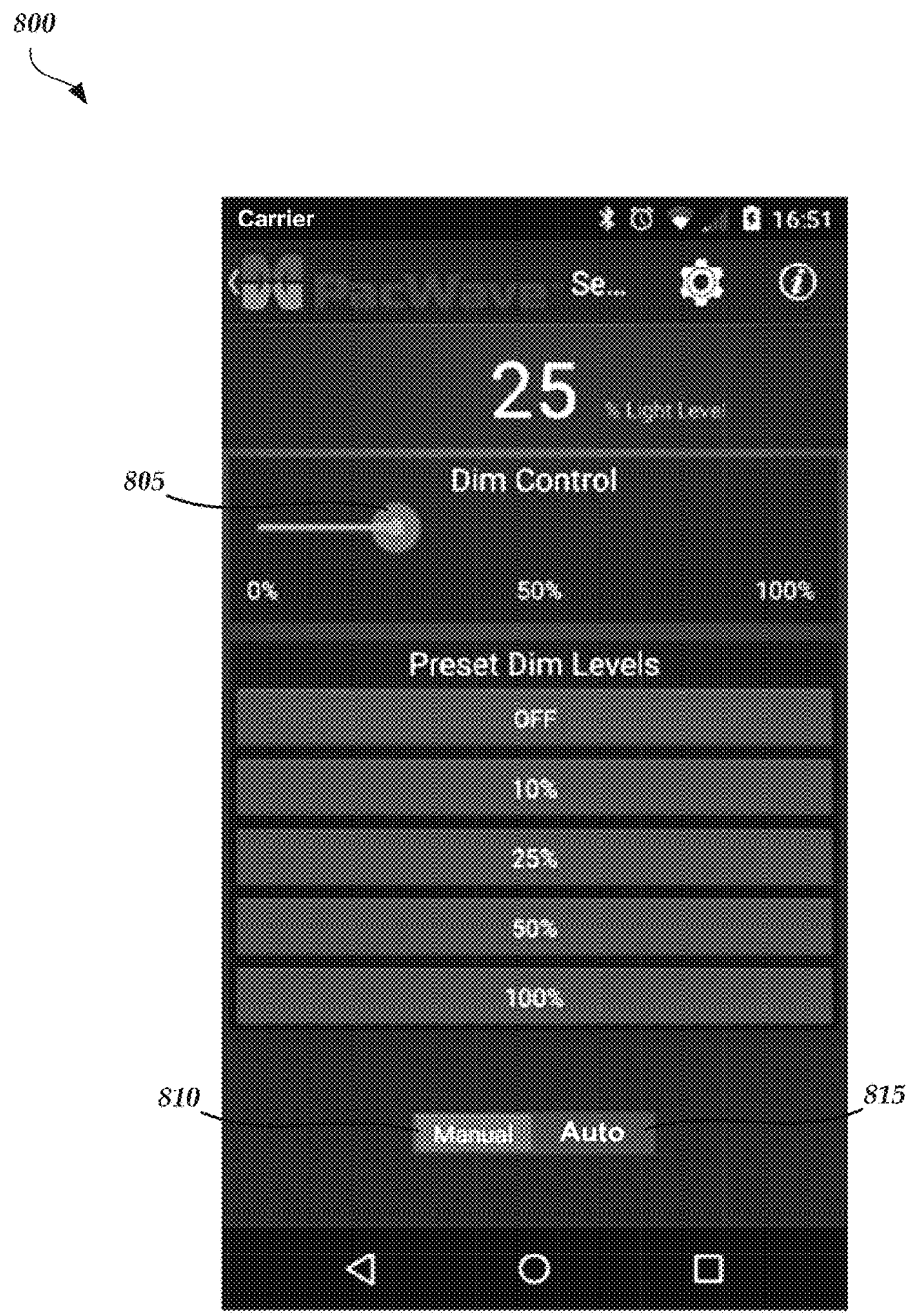
FIG. 8B illustrates an example user interface indicating that a motion sensor is operating in a manual mode, according to one embodiment.

As illustrated in FIG. 8B, the user interface 800 indicates that the motion sensor 120 is now operating in the manual mode, as indicated by button 810, given that the slider 805 has been moved by the user to a light output level of 25%.

As described herein, the user can adjust several motion sensor settings, including a light output level of a light source 130 when motion is first detected, a light output level of the light source 130 if motion is not detected after a first period of time, the length of time that corresponds to the first period of time, a light output level of the light source 130 if motion is not detected after a second period of time once the first period of time has passed, the length of time that corresponds to the second period of time, the sensitivity of the motion sensor (e.g., low, medium, high, etc.), an ambient light lux level, and/or the like. As illustrated in the user interface 900 of FIG. 9A, the length of time that corresponds to the first period of time can be adjusted by selecting button 905, the length of time that corresponds to the second period of time can be adjusted by selecting button 910, a light output level of a light source 130 when motion is first detected can be adjusted by selecting button 920, the light output level of the light source 130 if motion is not detected after a first period of time can be adjusted by selecting button 915, the sensitivity of the motion sensor 120 can be adjusted by selecting button 930, and the ambient light lux level can be adjusted by selecting button 925.

Figure 9A:
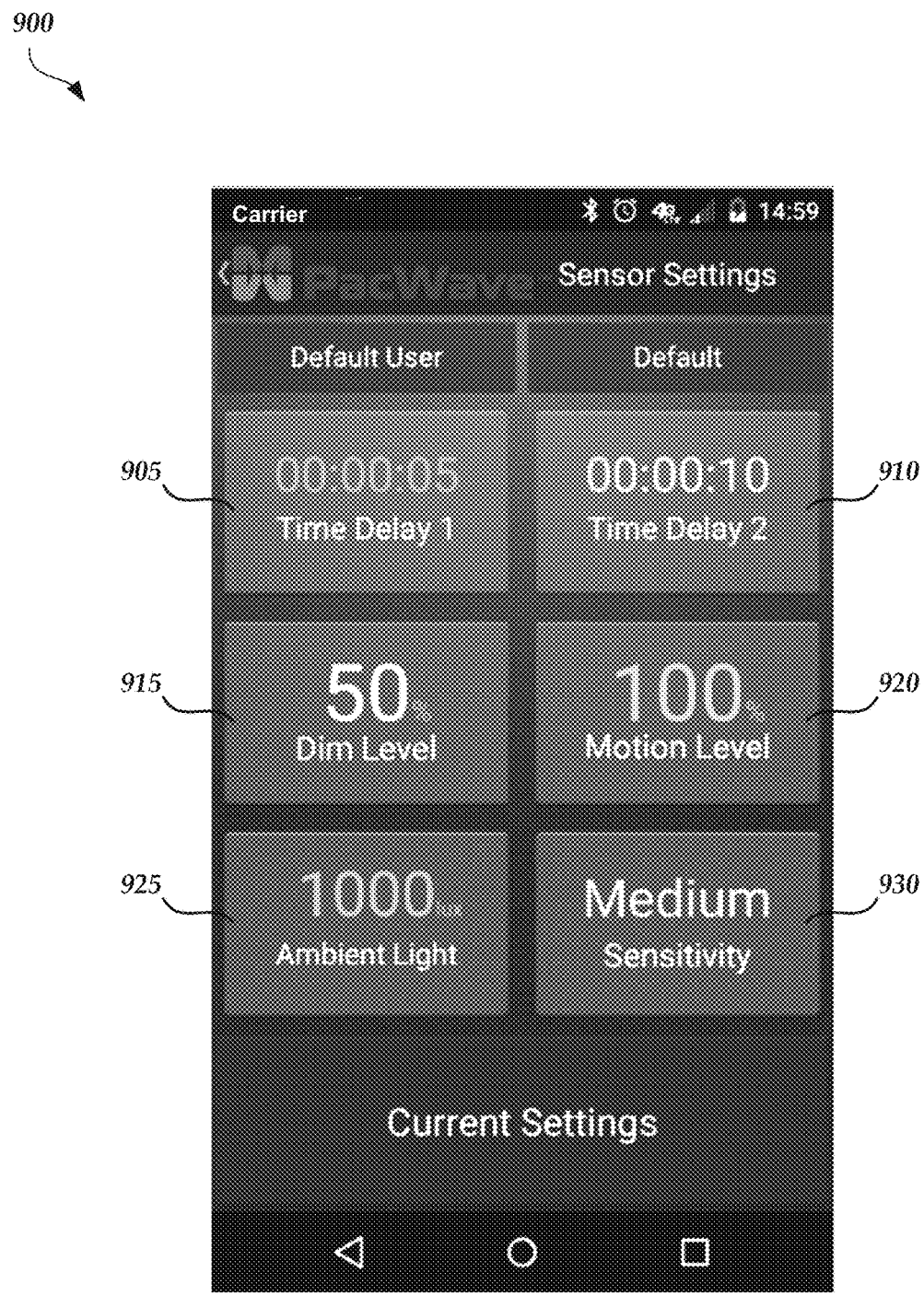
FIG. 9A illustrates an example user interface that allows a user to adjust a length of time that corresponds to the first period of time, according to one embodiment.
Figure 9B:
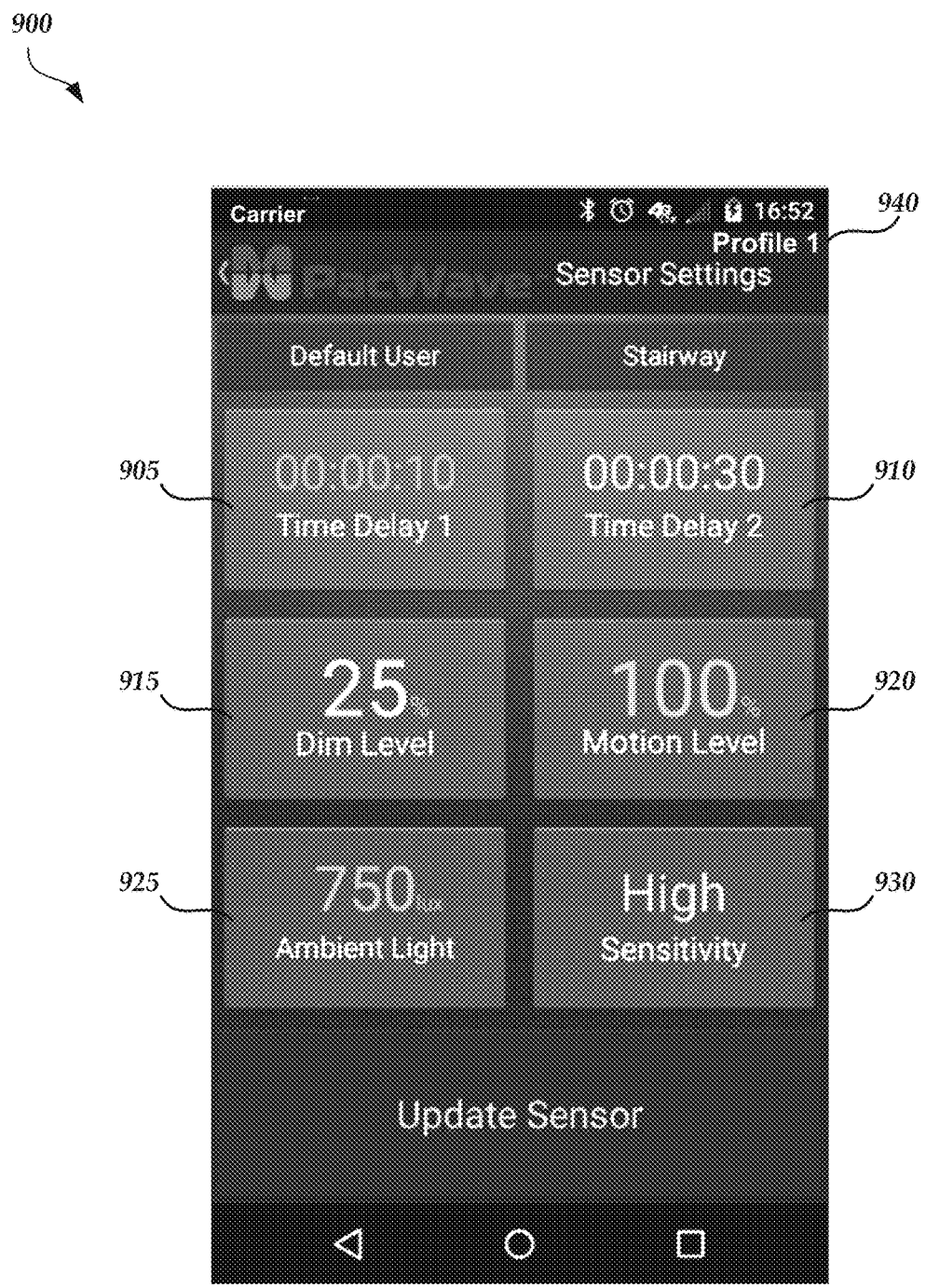
FIG. 9B illustrates an example user interface indicating that displayed motion sensor settings have been saved as "Profile 1," according to one embodiment.

Once the motion sensor settings are configured, the configuration can be saved as a profile that can then be applied to other motion sensors 120. Thus, the ability to create profiles allows for the "one touch" programming of new motion sensors 120. For example, as illustrated in FIG. 9B, the user interface 900 indicates that the displayed motion sensor settings have been saved as "Profile 1."

Figure 10:
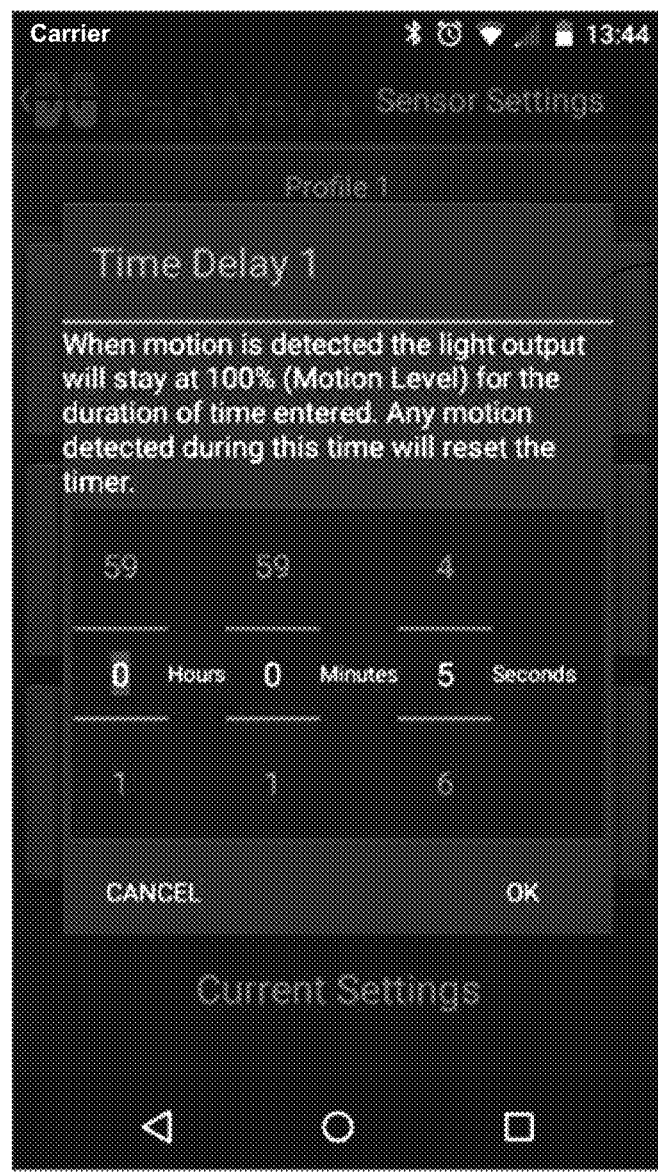
FIG. 10 illustrates an example user interface allowing a user to adjust the first period of time, according to one embodiment.
Figure 11:
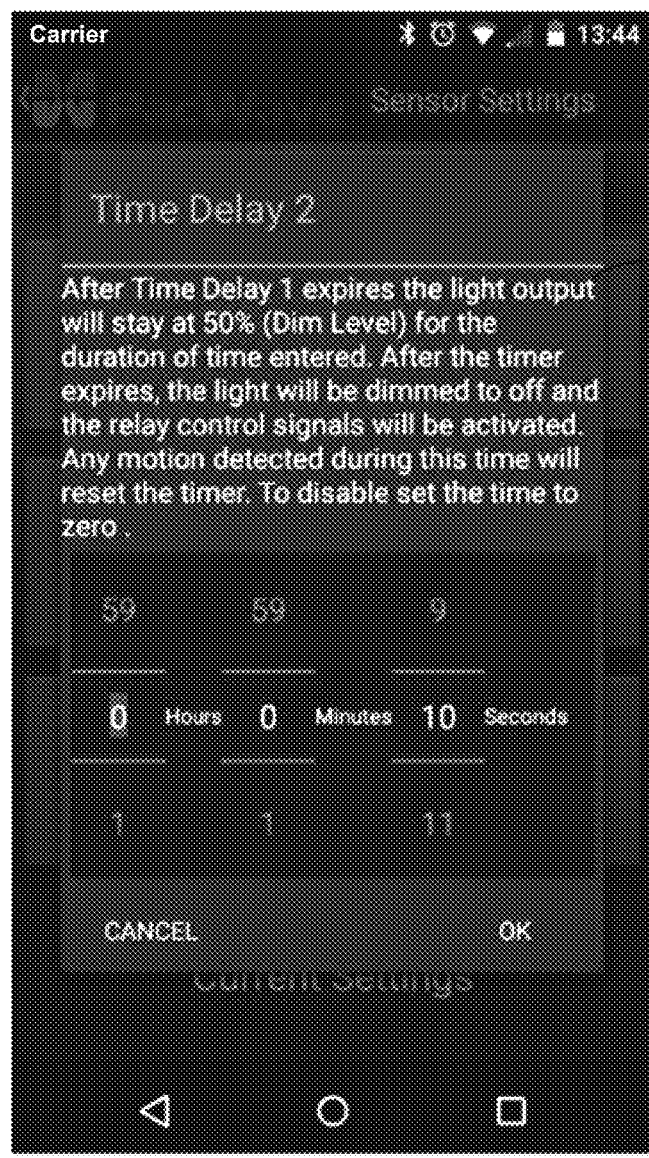
FIG. 11 illustrates an example user interface allowing a user to adjust the second period of time, according to one embodiment.
Figure 12:
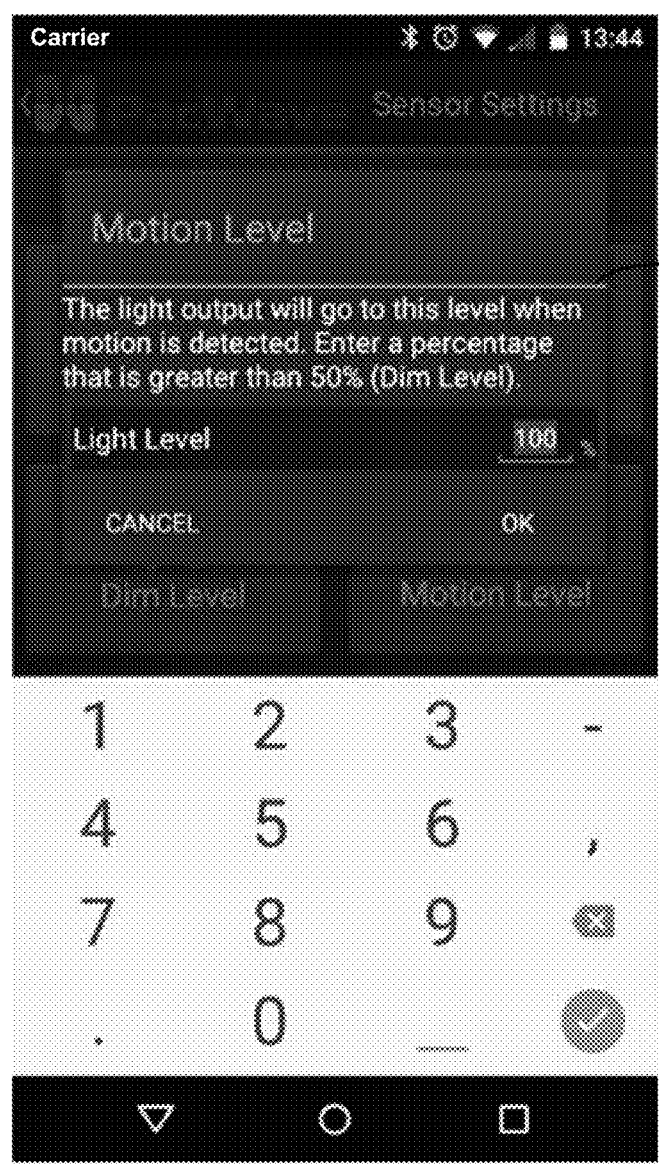
FIG. 12 illustrates an example user interface allowing a user to adjust a light output level that results when motion is detected, according to one embodiment.
Figure 13:
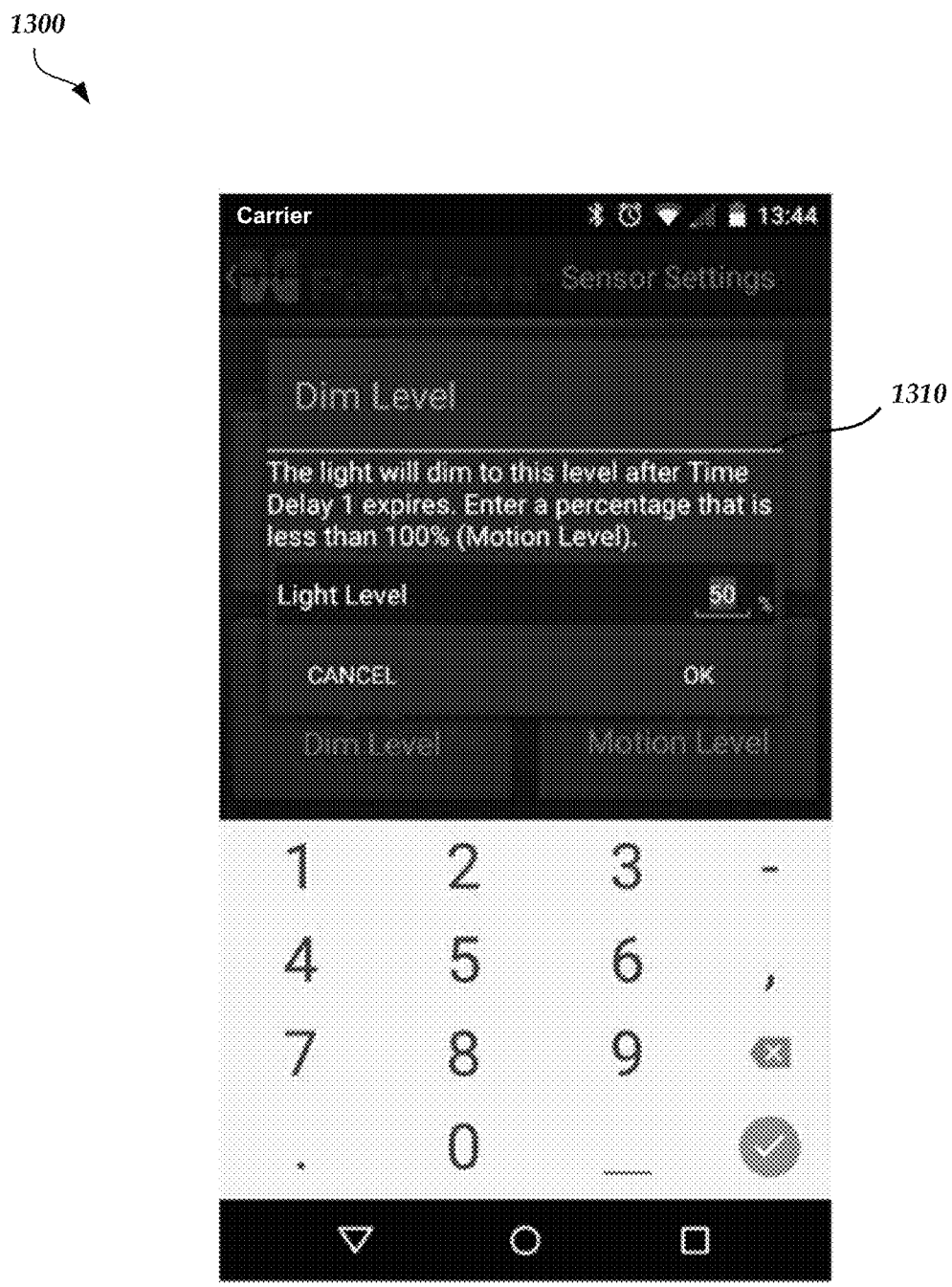
FIG. 13 illustrates an example user interface allowing a user to adjust a light output level that results after the first period of time expires, according to one embodiment.
Figure 14:
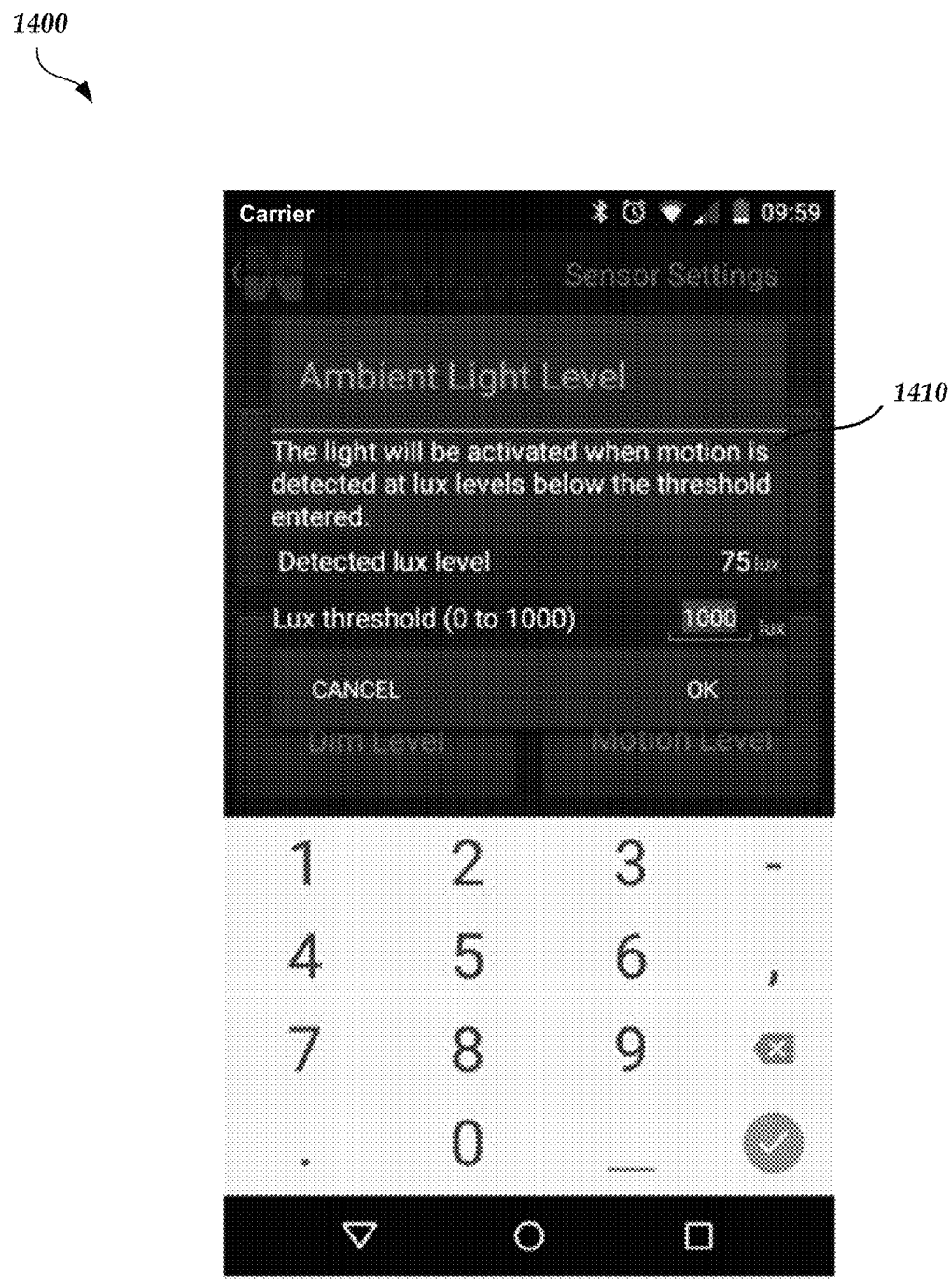
FIG. 14 illustrates an example user interface allowing a user to adjust a lux level that represents a maximum detected lux level that will still result in a light source being enabled when motion is detected, according to one embodiment.
Figure 15:
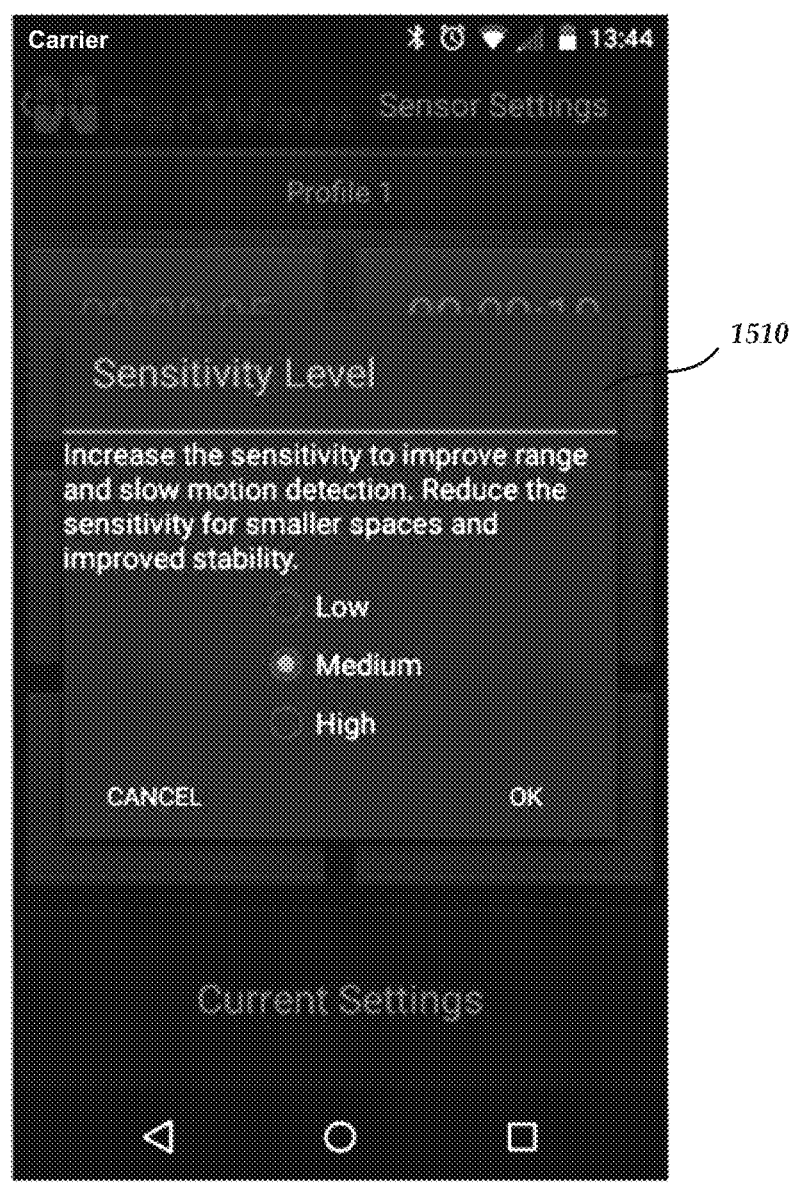
FIG. 15 illustrates an example user interface allowing a user to adjust a sensitivity level to improve range and/or to slow motion detection, according to one embodiment.

As described above, the motion sensor settings can be changed by selecting one of buttons 905, 910, 915, 920, 925, or 930. For example, if button 905 is selected, the user interface 1000 displays window 1010 (e.g., which allows a user to adjust the first period of time), as illustrated in FIG. 10. If button 910 is selected, the user interface 1100 displays window 1110 (e.g., which allows a user to adjust the second period of time), as illustrated in FIG. 11. If button 920 is selected, the user interface 1200 displays window 1210 (e.g., which allows a user to adjust a light output level that results when motion is detected), as illustrated in FIG. 12. If button 915 is selected, the user interface 1300 displays window 1310 (e.g., which allows a user to adjust a light output level that results after the first period of time expires), as illustrated in FIG. 13. If button 925 is selected, the user interface 1400 displays window 1410 (e.g., which allows a user to adjust a lux level that represents a maximum detected lux level that will still result in a light source being enabled when motion is detected), as illustrated in FIG. 14. If button 930 is selected, the user interface 1500 displays window 1510 (e.g., which allows a user to adjust a sensitivity level to improve range and/or to slow motion detection, where reducing sensitivity for smaller spaces may improve stability), as illustrated in FIG. 15.

Figure 16:
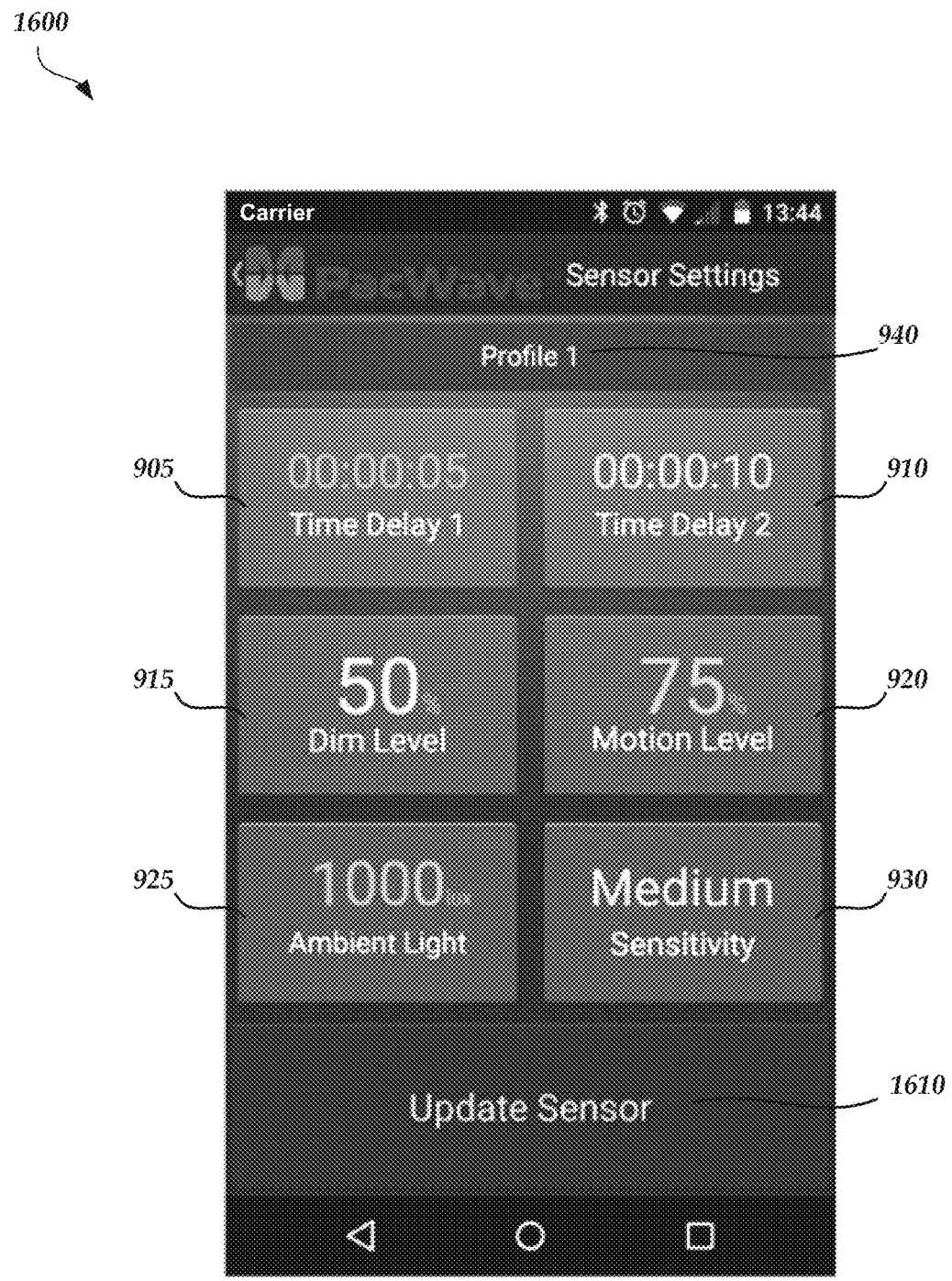
FIG. 16 illustrates an example user interface that displays a change in the light output level of a light source when motion is first detected, according to one embodiment.

As illustrated in the user interface 1600 or FIG. 16, the light output level of the light source 130 when motion is first detected has been changed from 100% to 75%. Thus, the user interface 1600 displays a button 1610 that, when selected, causes the update to be saved and/or the motion sensor 120 to send commands to the light source 130 (e.g., via the 0-10V driver dimming wire and/or the active high/low wire).

Figure 17:
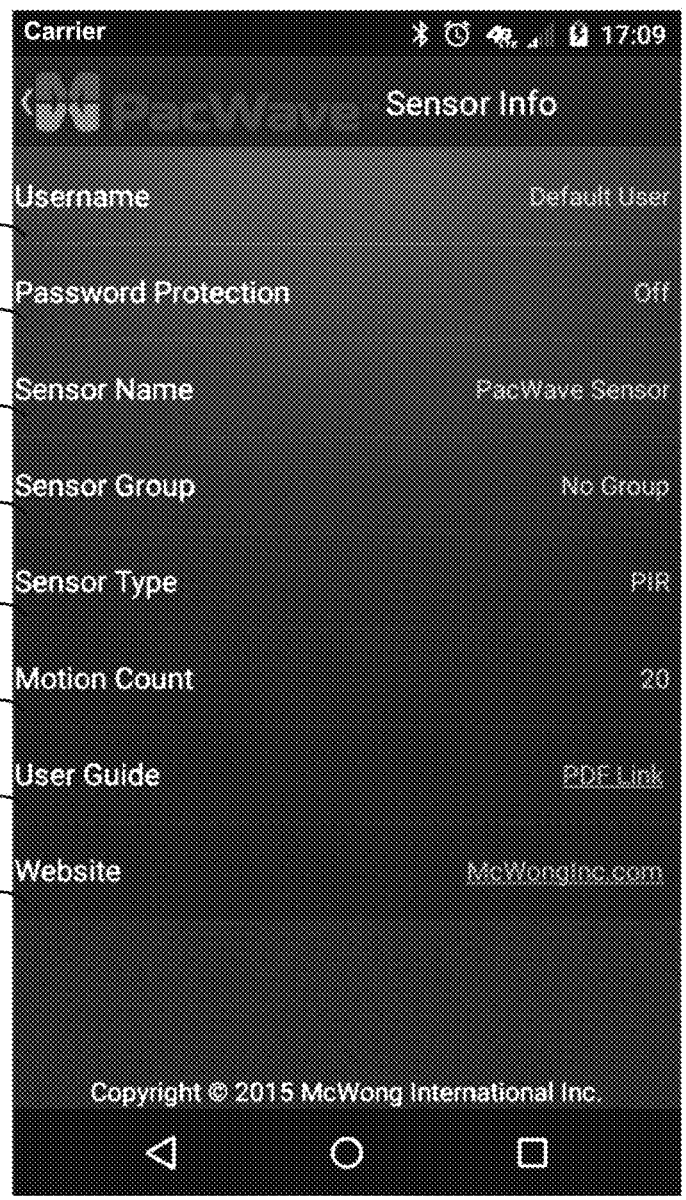
FIG. 17 illustrates an example user interface that displays statistics and characteristics of a selected motion sensor, according to one embodiment.

The user can also view statistics and characteristics of any selected motion sensor 120. For example, as illustrated in FIG. 17, the user interface 1700 displays a username of the user in row 1702, whether access to the motion sensor 120 is password protected in row 1705, the name of the motion sensor 120 in row 1710, a group to which the motion sensor 120 is associated, if any, in row 1715, the type of the motion sensor 120 (e.g., PIR, infrared, ultrasonic, CMOS, etc.) in row 1720, a number of times the motion sensor 120 has detected movement in row 1725, a link to a user guide of the specific motion sensor 120 in row 1730, and a link to a manufacturer website in row 1732. More details on the information and functionality provided by the user interfaces

400, 500, 600, 700, 800, 900, 1000, 1100, 1200, 1300, 1400, 1500, 1600, and 1700 is described below in Appendix B.

EXAMPLE EMBODIMENTS

One aspect of the disclosure provides a motion sensor device. The motion sensor device comprises a motion sensor configured to detect motion of an object; a wireless communications device coupled to the motion sensor, where the wireless communications device is configured to communicate with a user device over a wireless network to receive motion sensor settings; and a controller coupled to the motion sensor and the wireless communications device, where the controller is further coupled to a 0-10V driver dimming wire. The controller is configured to receive a first motion sensor setting from the wireless communications device, where a light output level of the light source when motion is initially detected is set at a first light output level, and where the first motion sensor setting indicates a change to the light output level of the light source when motion is initially detected from the first light output level to a second light output level selected by a user via an application running on the user device; receive a signal from the motion sensor indicating that motion of the object is detected; generate a second signal to instruct the light source to turn on at the second light output level; and transmit the second signal to a light source via the 0-10V driver dimming wire to cause the light source to turn on at the second light output level.

The motion sensor device of the preceding paragraph can have any sub-combination of the following features: where the controller is further configured to receive a second motion sensor setting, a third motion sensor setting, a fourth motion sensor setting, and a fifth motion sensor setting from the wireless communications device; where the second motion sensor setting indicates a first period of time, where the third motion sensor setting indicates a light output level of the light source after the first period of time has passed, where the fourth motion sensor setting indicates a second period of time, and where the fifth motion sensor setting indicates a light output level of the light source after the second period of time has passed; where the controller is further configured to: generate a third signal to instruct the light source to dim to the light output level indicated by the third motion sensor setting in response to a determination that the first period of time has passed, transmit the third signal to the light source via the 0-10V driver dimming wire to cause the light source to dim to the light output level indicated by the third motion sensor setting, generate a fourth signal to instruct the light source to dim to the light output level indicated by the fifth motion sensor setting in response to a determination that the second period of time has passed after the first period of time has passed, and transmit the fourth signal to the light source via the 0-10V driver dimming wire to cause the light source to dim to the light output level indicated by the fifth motion sensor setting; where the controller is further coupled to an active wire that couples to a power source, and where the controller is further configured to: generate a third signal to instruct the light source to dim to the light output level indicated by the third motion sensor setting in response to a determination that the first period of time has passed, transmit the third signal to the light source via the 0-10V driver dimming wire to cause the light source to dim to the light output level indicated by the third motion sensor setting, generate a fourth signal to shut off the light source in response to a determination that the second period of time has passed after the first period of time has passed, and transmit the fourth signal to a relay via the active wire, where the fourth signal causes the relay to prevent electrical current generated by the power source from passing to the light source; where the motion sensor device further comprises a light sensor coupled to the controller, where the light sensor is configured to measure a level of ambient light; where the controller is further configured to generate the second signal in response to a determination that the level of ambient level measured by the light sensor does not exceed a threshold value; where the controller is further configured to: receive an indication that a night mode is enabled, receive, after the night mode is enabled, a third signal from the motion sensor indicating that motion of the object is detected, receive a fourth signal from the light sensor that the level of ambient light measured by the light sensor is below a threshold value, generate a fifth signal to instruct the light source to turn on at a third light output level that is less than the second light output level, and transmit the fifth signal to the light source via the 0-10V driver dimming wire to cause the light source to turn on at the third light output level; where the motion sensor device receives power from a power source; where the power source is one of a power pack, an electrical outlet, a renewable energy source, or a battery; and where the motion sensor is at least one of a passive infrared sensor, a microwave sensor, an ultrasonic sensor, or a CMOS sensor.

Another aspect of the disclosure provides a sensor device comprising an occupancy sensor; a wireless communications device configured to wirelessly receive occupancy sensor setting data; a 0-10V driver dimming wire; a controller in communication with the occupancy sensor and the wireless communications device; and a housing enclosing the occupancy sensor, the wireless communications device, and the controller, where the light source is external to the housing, and where the 0-10V driver dimming wire provides an electrical connection from the sensor device to the light source. The controller is configured to: adjust a setting of the occupancy sensor based on the occupancy sensor setting data; generate dimming data for a light source; and transmit the dimming data to the light source via the 0-10V driver dimming wire.

The sensor device of the preceding paragraph can have any sub-combination of the following features: where the sensor device further comprises one or more wires configured to provide at least one of control high signal or a control low signal external to the sensor device to enable and/or disable dimming of the light source; where the occupancy sensor comprises at least one of a passive infrared sensor, a microwave sensor, an ultrasonic sensor, or a CMOS sensor; where the wireless communications device is a Bluetooth communication device; where the setting of the occupancy sensor comprises at least one of a motion sensitivity or a lux level; where the controller is configured to adjust the setting of the occupancy sensor to override a preset setting of the occupancy sensor; where the occupancy sensor is configured for operation with at least one of a 12 Volt power supply or a 24 Volt power supply; and where the occupancy sensor setting data is indicative of a dimming level of the light source, and where the controller is configured to adjust the dimming data for the light source based on the occupancy sensor setting data.

Another aspect of the disclosure provides a sensor device comprising an occupancy sensor; a 0-10V driver dimming wire; and a controller in communication with the occupancy sensor, the controller having an interface arranged to receive data from a wireless communication device via one or more wires. The controller is configured to: adjust a setting of the occupancy sensor based on the data received from the wireless communication device via the one or more wires; generate control data for a light source to control operation of the light source; and transmit the control data to the light source via the 0-10V driver dimming wire.

The sensor device of the preceding paragraph can have any sub-combination of the following features: where the sensor device further comprises one or more wires configured to provide at least one of control high signal or a control low signal external to the sensor device to enable and/or disable dimming of the light source; where the occupancy sensor comprises at least one of a passive infrared sensor, a microwave sensor, an ultrasonic sensor, or a CMOS sensor; where the wireless communications device is a Bluetooth communication device; where the setting of the occupancy sensor comprises at least one of a motion sensitivity or a lux level; where the controller is configured to adjust the setting of the occupancy sensor to override a preset setting of the occupancy sensor; where the occupancy sensor is configured for operation with at least one of a 12 Volt power supply or a 24 Volt power supply; and where the occupancy sensor setting data is indicative of a dimming level of the light source, and where the controller is configured to adjust the dimming data for the light source based on the occupancy sensor setting data.

Another aspect of the disclosure provides a sensor device comprising an occupancy sensor; a wireless communications device configured to wirelessly receive control data for a light source; a 0-10V driver dimming wire; a controller in communication with the occupancy sensor and the wireless communications device; and a housing enclosing the occupancy sensor, the wireless communications device, and the controller, where the light source is external to the housing, and where the 0-10V driver dimming wire provides an electrical connection from the sensor device to the light source. The controller is configured to generate dimming data for the light source based on occupancy data from the occupancy sensor and the control data for the light source; and transmit the dimming data to the light source via the 0-10V driver dimming wire.

The sensor device of the preceding paragraph can have any sub-combination of the following features: where the sensor device further comprises one or more wires configured to provide at least one of control high signal or a control low signal external to the sensor device to enable and/or disable dimming of the light source; where the occupancy sensor comprises at least one of a passive infrared sensor, a microwave sensor, an ultrasonic sensor, or a CMOS sensor; where the wireless communications device is a Bluetooth communication device; where the setting of the occupancy sensor comprises at least one of a motion sensitivity or a lux level; where the controller is configured to adjust the setting of the occupancy sensor to override a preset setting of the occupancy sensor; where the occupancy sensor is configured for operation with at least one of a 12 Volt power supply or a 24 Volt power supply; and where the occupancy sensor setting data is indicative of a dimming level of the light source, and where the controller is configured to adjust the dimming data for the light source based on the occupancy sensor setting data.

Terminology

Some or all of the methods and tasks described herein may be performed and fully automated by a motion sensor. The motion sensor typically includes a controller (e.g., a processor) (or multiple controllers) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the motion sensor. The results of the disclosed methods and tasks may be persistently stored by transforming physical storage devices, such as solid state memory chips and/or magnetic disks, into a different state.

Some or all of the methods and tasks described herein may also be performed and fully automated by a computer system, such as a user device. The computer system typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. The results of the disclosed methods and tasks may be persistently stored by transforming physical storage devices, such as solid state memory chips and/or magnetic disks, into a different state.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," "for example," "such as," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are used and to be construed inclusively, in an open-ended fashion, and do not exclude additional elements, features, acts, operations, and so forth. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description of Certain Embodiments using the singular or plural number may also include the plural or singular number, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A motion sensor device comprising:
a motion sensor configured to detect motion of an object;
a wireless communications device coupled to the motion sensor, wherein the wireless communications device is configured to communicate with a user device over a wireless network to receive motion sensor settings; and
a controller coupled to the motion sensor and the wireless communications device, wherein the controller is further coupled to a 0-10V driver dimming wire, and wherein the controller is configured to:
receive information indicative of a first motion sensor setting from the wireless communications device, wherein the first motion sensor setting indicates a change to a light output level of a light source from a first light output level to a second light output level selected by a user via an application running on the user device;
receive a signal from the motion sensor indicating that motion of the object is detected;
generate a second signal to instruct the light source to operate at the second light output level based on the signal from the motion sensor and the first motion sensor setting; and
transmit the second signal to the light source via the 0-10V driver dimming wire to cause the light source to turn on at the second light output level.

2. The motion sensor device of claim 1, wherein the controller is further configured to receive a second motion sensor setting, a third motion sensor setting, a fourth motion sensor setting, and a fifth motion sensor setting from the wireless communications device.

3. The motion sensor device of claim 2, wherein the second motion sensor setting indicates a first period of time, wherein the third motion sensor setting indicates a light output level of the light source after the first period of time has passed, wherein the fourth motion sensor setting indicates a second period of time, and wherein the fifth motion sensor setting indicates a light output level of the light source after the second period of time has passed.

4. The motion sensor device of claim 3, wherein the controller is further configured to:
generate a third signal to instruct the light source to dim to the light output level indicated by the third motion sensor setting in response to a determination that the first period of time has passed;

transmit the third signal to the light source via the 0-10V driver dimming wire to cause the light source to dim to the light output level indicated by the third motion sensor setting;

generate a fourth signal to instruct the light source to dim to the light output level indicated by the fifth motion sensor setting in response to a determination that the second period of time has passed after the first period of time has passed; and transmit the fourth signal to the light source via the 0-10V driver dimming wire to cause the light source to dim to the light output level indicated by the fifth motion sensor setting.

5. The motion sensor device of claim 3, wherein the controller is further coupled to an active wire coupled to a power source, and wherein the controller is further configured to:

generate a third signal to instruct the light source to dim to the light output level indicated by the third motion sensor setting in response to a determination that the first period of time has passed;

transmit the third signal to the light source via the 0-10V driver dimming wire to cause the light source to dim to the light output level indicated by the third motion sensor setting;

generate a fourth signal to shut off the light source in response to a determination that the second period of time has passed after the first period of time has passed; and transmit the fourth signal to a relay via the active wire, wherein the fourth signal causes the relay to prevent electrical current generated by the power source from passing to the light source.

6. The motion sensor device of claim 1, further comprising a light sensor coupled to the controller, wherein the light sensor is configured to measure a level of ambient light.

7. The motion sensor device of claim 6, wherein the controller is further configured to generate the second signal in response to a determination that the level of ambient level measured by the light sensor does not exceed a threshold value.

8. The motion sensor device of claim 6, wherein the controller is further configured to:

receive an indication that a night mode is enabled;

receive, after the night mode is enabled, a third signal from the motion sensor indicating that motion of the object is detected;

receive a fourth signal from the light sensor that the level of ambient light measured by the light sensor is below a threshold value;

generate a fifth signal to instruct the light source to turn on at a third light output level that is less than the second light output level; and transmit the fifth signal to the light source via the 0-10V driver dimming wire to cause the light source to turn on at the third light output level.

9. The motion sensor device of claim 1, wherein the motion sensor device is configured to receive power from a power source.

10. The motion sensor device of claim 1, wherein the light output level of the light source when motion is initially detected is initially set at the first light output level prior to reception of the information indicative of the first motion sensor setting.

11. A light fixture comprising the motion sensor device of claim 1, the light source, and a housing enclosing the light source and the motion sensor device.

12. The motion sensor device of claim 1, wherein the motion sensor is at least one of a passive infrared sensor, a microwave sensor, an ultrasonic sensor, or a complementary metal-oxide-semiconductor (CMOS) sensor.

* * * * *